United States Patent [19]

Tung et al.

[11] Patent Number: 5,511,193
[45] Date of Patent: Apr. 23, 1996

[54] TEXT SERVICES MANAGER PROVIDING MULTIPLE INSTANCES OF INPUT METHODS FOR TEXT LANGUAGE PROCESSING AND AUTOMATIC SYNCHRONIZATION BETWEEN MET HODS

[75] Inventors: Kenny S. C. Tung, San Jose, Calif.; John Harvey, Philadelphia, Pa.; Yasuo Kida, Tokyo, Japan; Christopher S. Derossi, San Jose, Calif.; Keisuke Hara, Yokohama; Nobuhiro Miyatake, Fuchu, both of Japan

[73] Assignee: Apple Computer, Inc., Cupertino, Calif.

[21] Appl. No.: 19,744

[22] Filed: Feb. 19, 1993

[51] Int. Cl.⁶ ........................................................ G06F 9/44
[52] U.S. Cl. ................................. 395/650; 364/DIG. 1; 364/280; 364/286
[58] Field of Search .................................. 395/650, 700; 364/419.09

[56] References Cited

U.S. PATENT DOCUMENTS

| | | | |
|---|---|---|---|
| 4,544,276 | 10/1985 | Horodeck | 400/110 |
| 5,285,387 | 2/1994 | Kurahara et al. | 364/419.09 |
| 5,307,267 | 4/1994 | Yang | 364/419.09 |

OTHER PUBLICATIONS

Apple Computer, Inc., "Inside Macintosh", vol. I–IV, 1985 & 1986, selected pages.
Apple Computer, Inc., "Inside Macintosh:Text", 1993, pp. 7-1 to 7-107.

Primary Examiner—Kevin A. Kriess
Attorney, Agent, or Firm—Greg T. Sueoka

[57] ABSTRACT

A Text Services Manager (TSM) maintains and uses TSM documents to ensure proper communication between applications and their needed input methods. A TSM document comprises information about the input methods and text services used by a particular instance of an application. One TSM document is preferably associated with each working document represented by an application window. Through use of the TSM document, the TSM provides for multiple instances of a particular input method, and the automatic synchronization of the input method to the active window. The preferred embodiment of the present invention comprises novel methods that provide this functionality including: methods for opening or closing a TSM aware application, methods for creating and disposing of TSM documents, and methods for activating and deactivating a TSM document.

28 Claims, 21 Drawing Sheets

TEXT SERVICES MANAGER PROVIDING MULTIPLE INSTANCES OF INPUT METHODS FOR TEXT LANGUAGE PROCESSING AND AUTOMATIC SYNCHRONIZATION BETWEEN MET HODS

CROSS-REFERENCE RELATED APPLICATIONS

This application relates to U.S. patent application Ser. No. 08/020,314, entitled "Text Services Manager," filed on Feb. 19, 1993, which is incorporated herein by reference, and assigned to the same assignee.

BACKGROUND OF THE INVENTION

1. Field of the Invention

The present invention relates generally to computer operating system software, and in particular, to methods for communicating between application programs and various input services provided by the system software. Still more particularly, the present invention relates to a system that provides: several input methods for processing text of different languages, methods for maintaining multiple instances of input methods, and methods for automatically synchronizing input methods.

2. Description of the Related Art

An on-going problem in designing computers for use worldwide is adapting the standard QWERTY-type keyboard to handle the large number of characters found in the various written languages. For instance, written Chinese has no alphabet, instead it consists of approximately 50,000 characters. The Chinese writing system is logo graphic, meaning that each character stands for a word or part of a word. Similarly, the Japanese character set, Kanji, is borrowed from the Chinese system, and is a combination of Chinese characters and Kana characters. The Kanji character set officially has several thousand characters, although many more characters are in common use. Likewise, the Korean language has a set of several thousand characters and ideographs.

In order to accommodate such languages that have thousands of characters in the character set, a variety of input methods for converting input from a keyboard or similar input device to a particular character have been developed. For example, there are several methods for converting keyboard inputs to Kanji for the Japanese language. One such input method begins by accepting Roman characters as input with a standard keyboard, and displays the Roman characters. Then the user manipulates the input device to convert the Roman characters to Kana characters. The Kana characters can then be further manipulated in accordance with the rules of the input method to convert groups of Kana characters to their Kanji equivalents. There are other input methods for each language that are designed based on the language to allow use of the standard keyboard for inputting characters.

To assist users of character-based text processing software, software developers have produced Front-End Processors (FEPs) which convert the sequential keyboard entries of the user to an appropriate letter of the target character set. These FEPs are also often referred to as "input methods." The existing system software is very inflexible because it requires that the application have only one specific FEP associated with it. The application would specify which FEP it was going to use. The user has little choice as to which FEP was available. This inflexibility between input methods is a particular problem when attempting to generate a document having multiple language translations, such as multinational user's manual. Thus, there is a need for an operating system that allows applications to easily switch between different input methods.

In addition to front-end processors, application programs take advantage of numerous other text services modules which augment and facilitate the capabilities of the application. Typical additional text services include spelling checkers, hyphenation checkers, grammar checkers, dictionary lookup services, thesauruses, syntax checkers, and equation processors.

Some applications have attempted to resolve the inflexibility for input methods and text services by providing the capability within the application to process different formats of input using multiple input methods or FEPs. However, such applications are problematic in two respects. First, they require significant amounts of time to create and debug as well as suffering from performance problems at run-time because there is a significant burden for the application to track the input, and manage the FEPs. Second, the applications still suffer from inflexibility problems. For any new text service or input method to be part of the application, the application must be revised to include the new input method or text service as a option for input to the application. Such revisions to the application are not trivial, and can require hundreds of man hours. Thus, there is a need for an operating system that accommodates the addition of new text services and input methods along with easy access to such services.

Another problem for existing systems is maintaining the proper operation between input methods when the user switches between applications. In the past, applications have communicated directly with the input method or FEP. Thus, there are no existing systems that allow more than one input method to be active. Existing systems do not address the problem or need for having several instances of each input method (one for each application) open. Existing systems also do not provide any method for synchronizing the input method with the window or application that is active.

Therefore, there is a needed for a computer operating system that includes a means which operates as an interface between a given application and a selection of text services or input methods, enabling the user to select from among and switch between various text services, without regard for the specific protocol requirements of the text service or input method.

SUMMARY OF THE INVENTION

The present invention overcomes the limitations and shortcomings of the prior art with a system and method for providing multiple instances of input methods, and a method for synchronizing input methods. The present invention advantageously provides a Text Services Manager (TSM) that maintains communication between the application and needed input methods or text services. The text services manger maintains and uses TSM documents to ensure proper communication between applications and their needed input methods. A TSM document comprises information about the input methods and text services used by a particular instance of an application. In the preferred embodiment, there is one TSM document associated with each working document represented by an application window shown on the screen of the display device. Through use of the TSM document, the system of the present invention provides for the use of multiple instances of a particular input method, and the automatic synchronization of the input method to the active window. The preferred embodiment of the present invention comprises novel methods that provide this functionality such as: methods for opening or closing a TSM aware application, methods for creating and disposing of TSM documents, and methods for activating and deactivating a TSM document.

DETAILED DESCRIPTION OF THE PREFERRED EMBODIMENT

Figure 1:
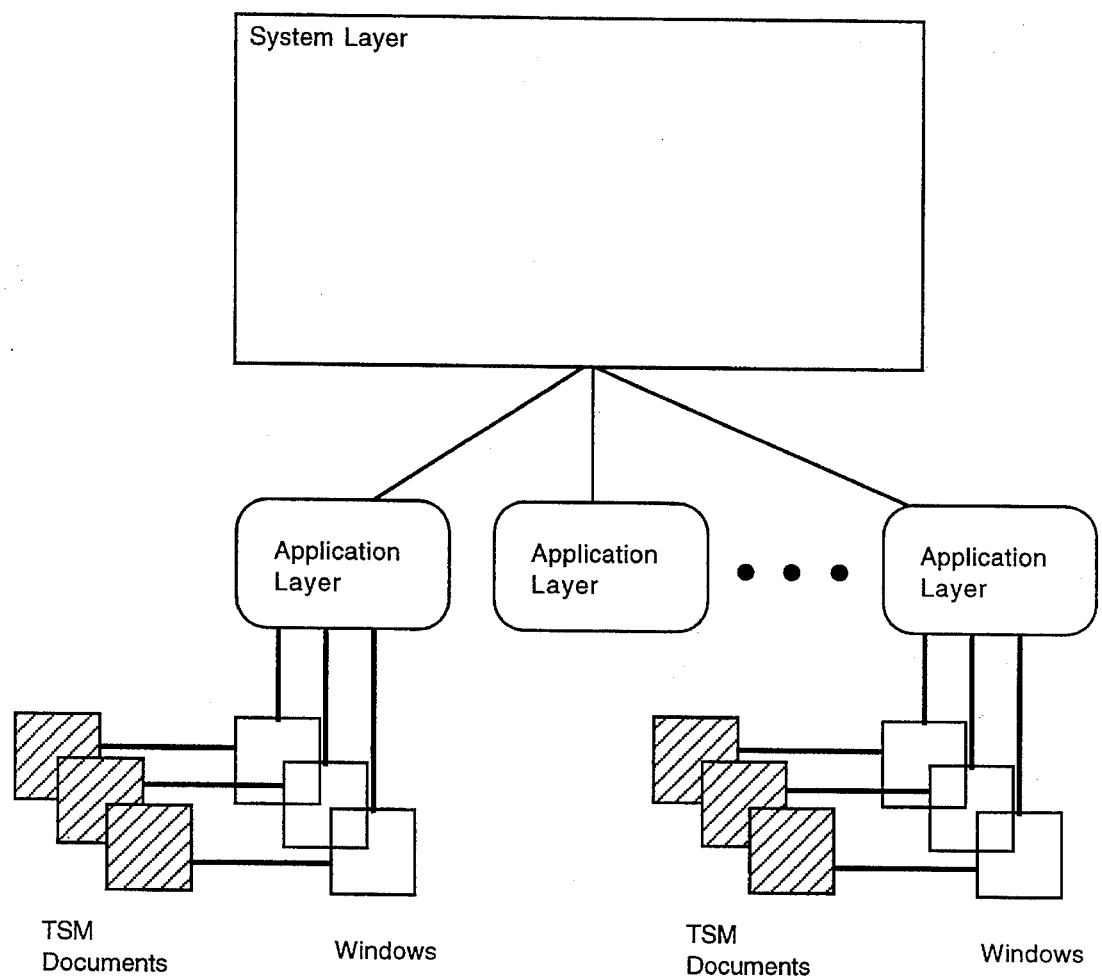
FIG. 1 is a diagram of an architectural overview for text services manager (TSM) documents of the present invention.

Referring now to FIG. 1, a conceptual diagram of the preferred embodiment of the present invention is shown. The present invention uses the concept of a TSM document to manage communication between the application layer and the input methods in the system layer, as will be discussed in more detail below. In the preferred embodiment, the system provides one TSM document for each working document or window. Therefore, as shown in FIG. 1, there may be multiple TSM documents created by a single application. In the preferred embodiment, there is only one TSM document corresponding to a window opened by the application, however, there could be multiple TSM documents corresponding to a single window. Under the working document/window concept in the Macintosh Operating System, only one window is active at any particular instance, although several windows even for the same application may be open simultaneously. Additional information on an exemplary system for the methods of the present invention can be found in *Inside Macintosh*, Addison-Wesley Publishing Company, Inc., 1985, Vols. I–VI. Similarly, only one TSM document, the one corresponding to the active window, is active at any instance. Through the use of TSM documents, the present invention provides for multiple open instances of the same input method by creating a TSM document for each instance of the input method required, as well as, automatic synchronization of the input method to the active window by activating the TSM document corresponding to the active window.

Figure 10:
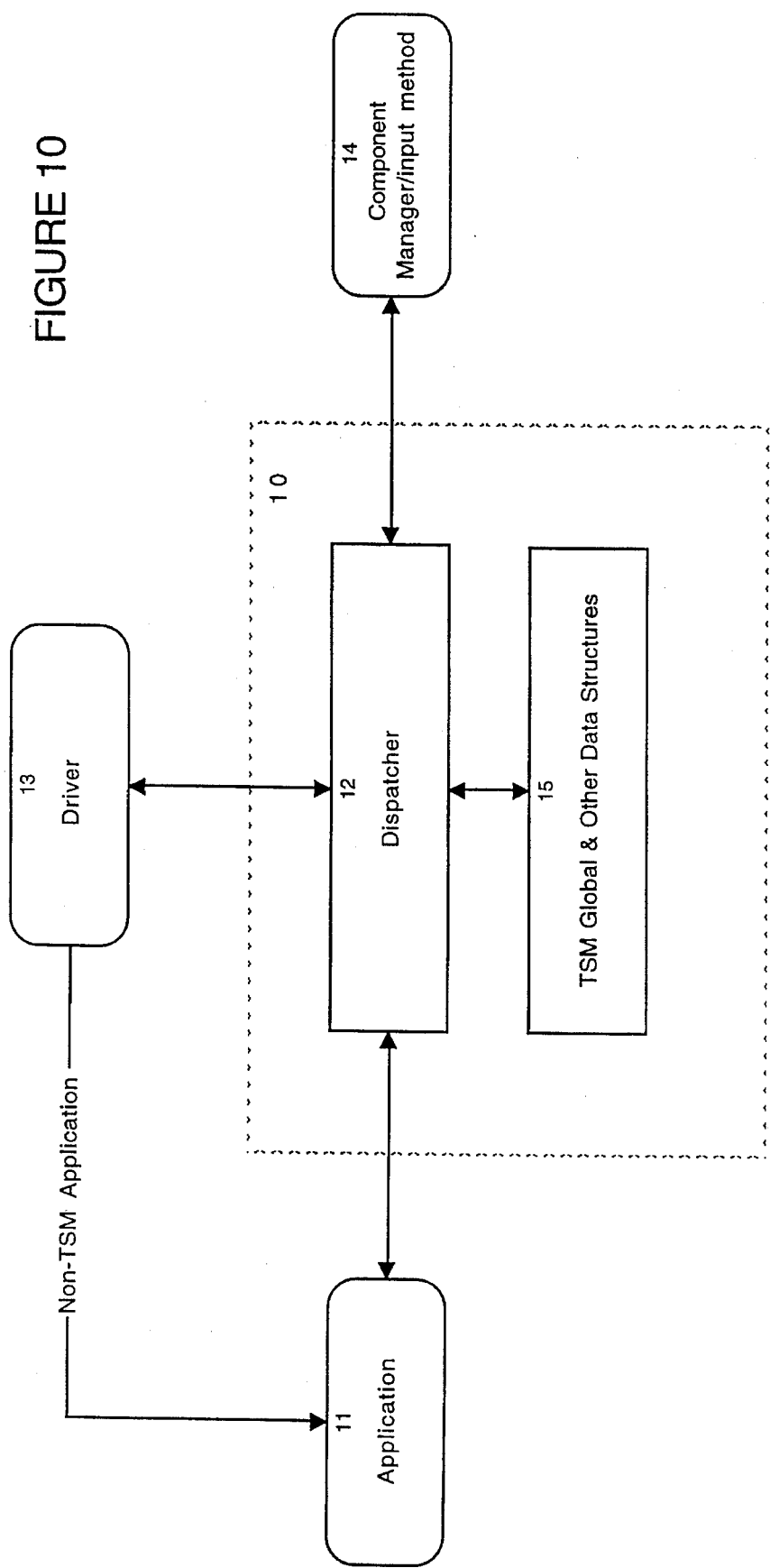
FIG. 10 is a simplified block diagram of the TSM of the present invention.

Referring now to FIG. 10, a simplified block diagram of a Text Services Manager (TSM) 10 used in the preferred embodiment of the present invention is shown. The TSM 10 preferably comprises a dispatcher 12 and a TSM global and other data structures 15. The dispatcher 12 is preferably coupled for communication with an application 11, a driver 13, and a component manager 14. The dispatcher 12 oversees the communication between the driver 13 or application 11 and the component manager 14. The dispatcher 12 receives events from the driver 13 or the application 11 and then sends the events to the proper input method or component (via the component manager 14) associated with the particular instance of the application 11 that generated the event. The dispatcher 12 determines the appropriate input method or component by referencing the TSM global and other data structures 15. Once the input method or component completes its processing of the event, another event (e.g., an Apple Event) is returned to the application 11 via the TSM 10. For the return path, the dispatcher 12 performs a similar function by using the TSM global and other data structures 15 to determine the instance of the application that should receive the returning event. The TSM 10 then sends the event to the identified application. The use of such a TSM structure is particularly advantageous because it greatly simplifies the use of various input methods for the application. Programmers no longer have to specifically identify the input method used by a particular application, instead, it is automatically handled by the TSM 10.

Figure 8:
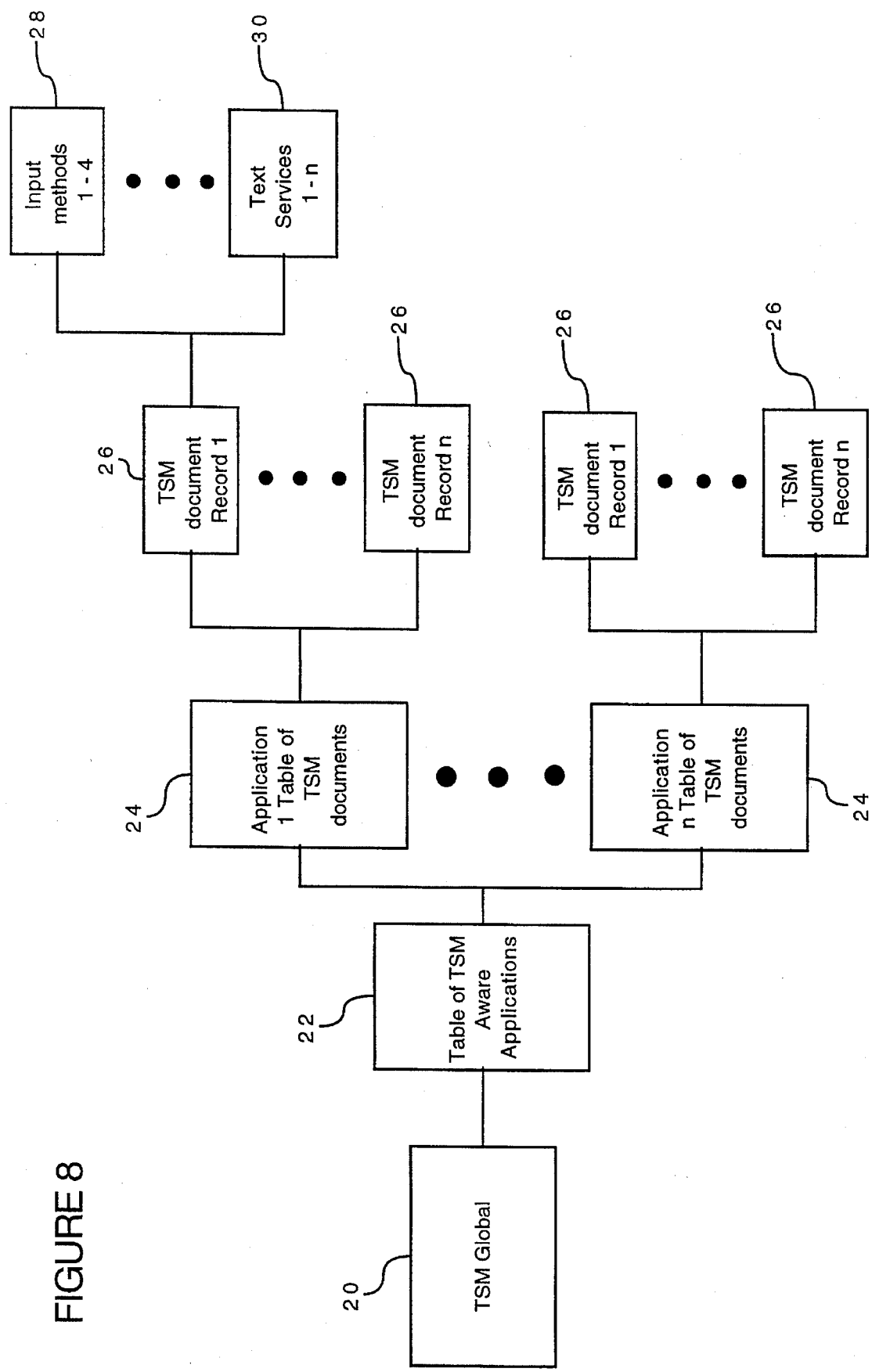
FIG. 8 is a block diagram of the preferred organizational hierarchy for the data structures used and manipulated by the TSM.

Referring now to FIGS. 8 and 9, a preferred embodiment for the TSM global and other data structures 15 will be described. The organization of the data structures used in TSM 10 can best be understood with reference to FIG. 8. The data structure preferably comprises a TSM global 20, a Table of TSM Aware Applications 22, a Table of TSM Documents 24 for each registered application, one or more TSM documents 26, one or more input methods 28, and one or more text services 30. The TSM global 20 includes a pointer to the Table of TSM Aware Applications 22. In turn, each application in the Table of TSM Aware Applications 22 has a pointer to a Table of TSM Documents 24. Each of the TSM documents 26 in the table 24 further includes a pointer to input methods 28 and text services 30. The use of this structure is particularly advantageous because it allows each application to have multiple instances of TSM documents 26. Each of the TSM documents 26 in turn provides for its own input method 28 and text services 30. Therefore, with the preferred embodiment of the system, any application can have multiple instances of the same input method opened by creating a new TSM document 26 for each instance needed. The structure of the present invention also allows the TSM 10 to synchronize the current input method to the active window by searching the data structures for the input method associated with the TSM document 26 corresponding to the active window.

Figure 9A:
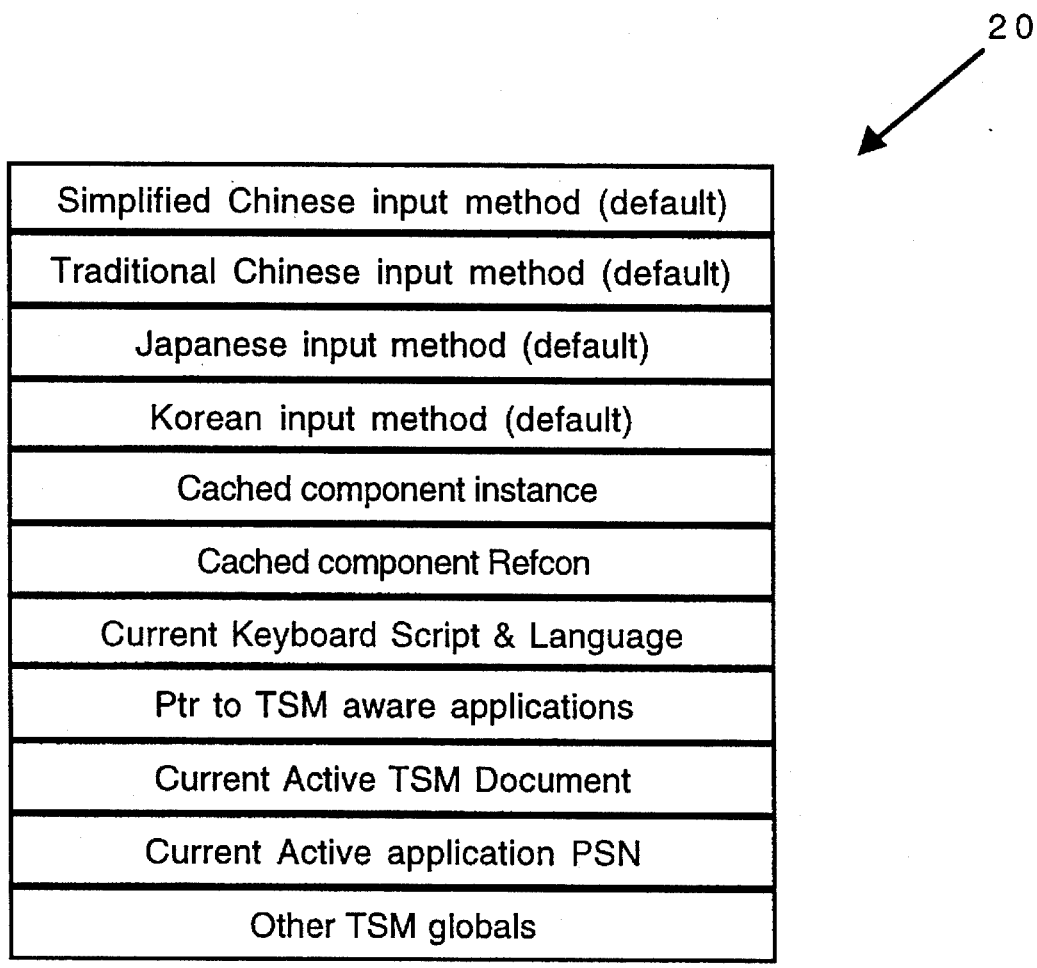
FIGS. 9A, 9B, 9C, 9D, and 9E are graphical representations of the preferred data structures used by the TSM of the present invention.

FIG. 9A shows a preferred embodiment for the TSM global 20 of the present invention. In an exemplary embodiment, the TSM global 20 is a data structure with 11 fields. The first four fields identify the default input methods for simplified Chinese, traditional Chinese, Japanese, and Korean, respectively. Then next two fields are used to identify a cached component instance and its refcon. Then next field is used to identify the current keyboard script and language that is active for the system. The next field stores a pointer to the Table of TSM Aware Applications 22. This field is used to identify applications that use the TSM 10, and determine any input methods associated with the application. The ninth field identifies the TSM document 26 that is currently active. The tenth field identifies the process serial number (PSN) for the application that is currently active. At most there can be only one active application and one active TSM document 26. Finally, the last field in the TSM global 20 contains other information effecting the operation of the TSM 10.

Figure 9B:
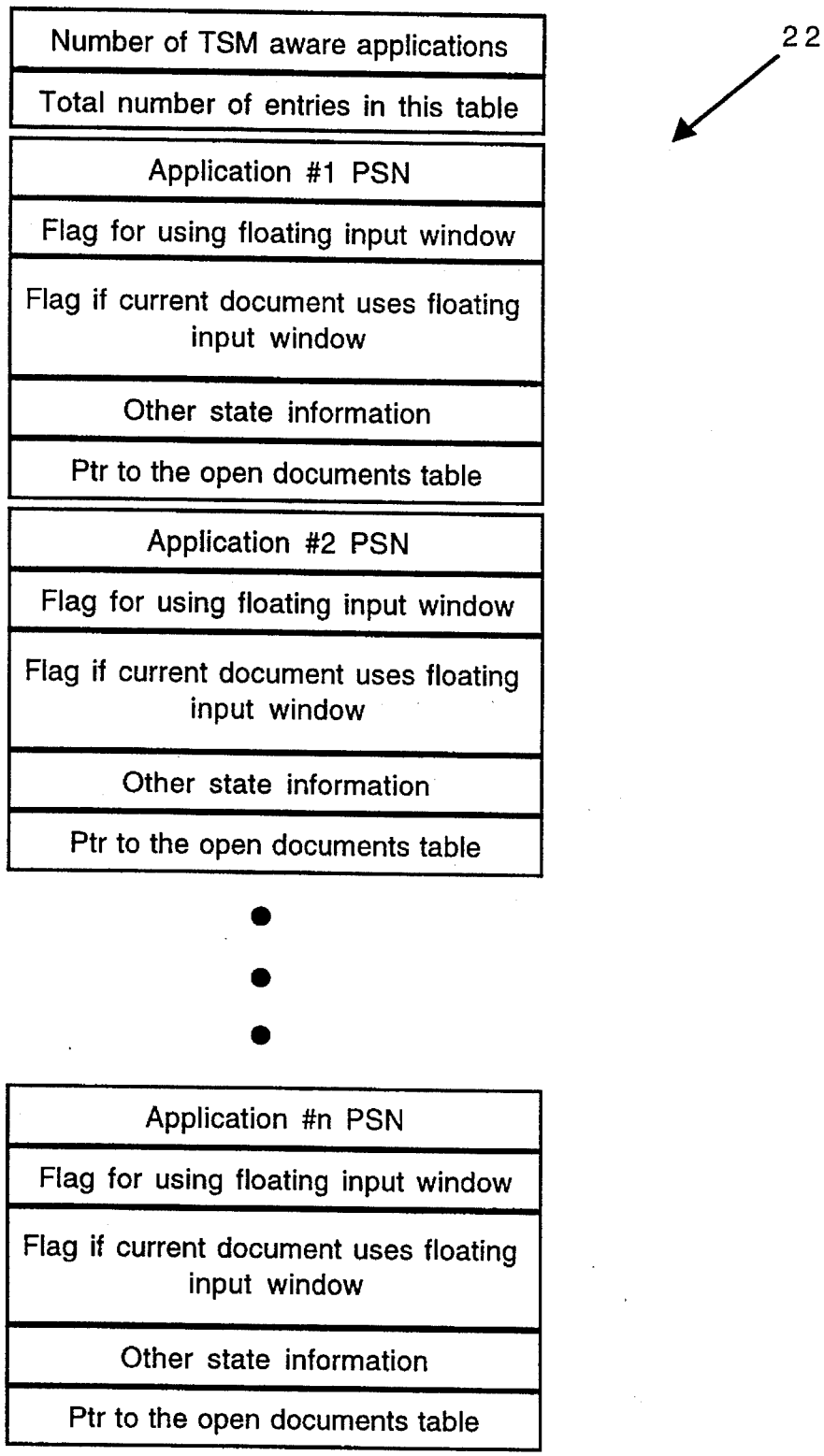

Referring now to FIG. 9B, the preferred embodiment for the Table of TSM Aware Applications 22 is shown. The table 22 preferably has a first field that stores a value indicative of the number of applications in the table 22. Each application listed in the table 22 has been determined to be TSM aware or registered. In other words, each application listed in the table 22 uses procedure calls to the TSM 10 to assign, open, close, activate, and deactivate input methods. The second field in the Table of TSM Aware Applications 22 stores a value representing the size of the table 22. This field specifies the number of entries the table 22 can hold. For each application registered in the table 22, five additional sub-fields are provided. In the first sub-field, the PSN for the application is stored. The next two sub-fields store flags indicating whether the application and document, respectively, use a floating input window as opposed to a in line input. The fourth sub-field stores other state information, and the fifth sub-field holds a pointer to a Table of TSM Documents 24 created by this application. Thus, with this structure, the present invention is able to store the input methods associated with a plurality of applications.

Figure 9C:
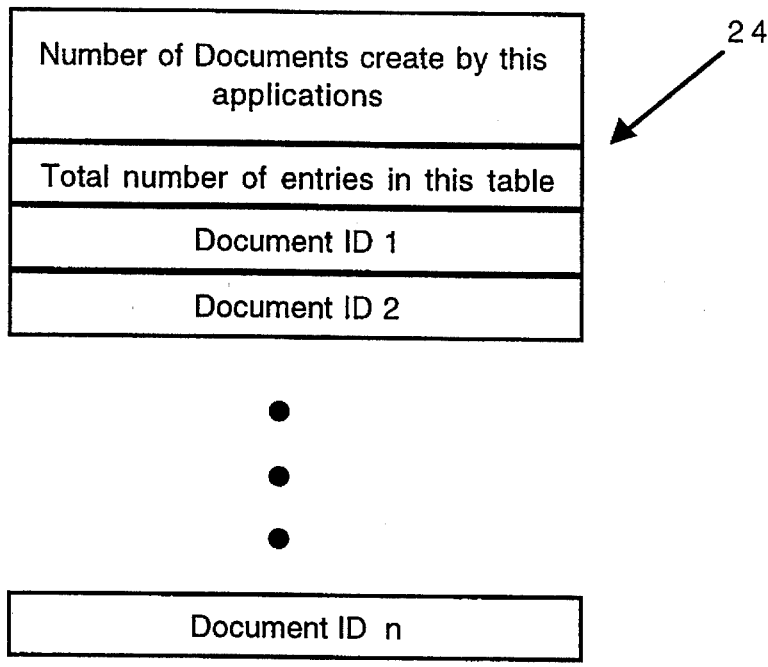

As shown in FIG. 9C, the Table of TSM Documents 24 has a similar structure to the Table of TSM Aware Applications 22. The first two fields in the Table of TSM Documents 24 store the number of documents 26 created by the associated application, and the total number of entries (table size) in this table 24, respectively. Each of the following fields stores a TSM document ID. Each application can have several TSM documents 26. Thus, any number of TSM documents 26 can be associated with an application because the size of the table 24 can be increased. The use of this table structure is particularly advantageous because it allows any application to have multiple instances of input methods. Each document 26 is used to identify an input method for the associated application and store other states of the input method. Thus, one application can have two documents with the same input method with each document storing different states for its corresponding instance of the input method.

Figure 9D:
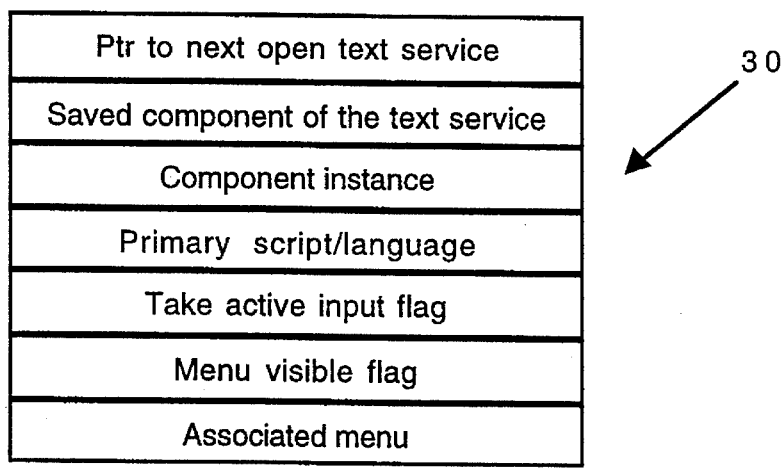
Figure 9E:
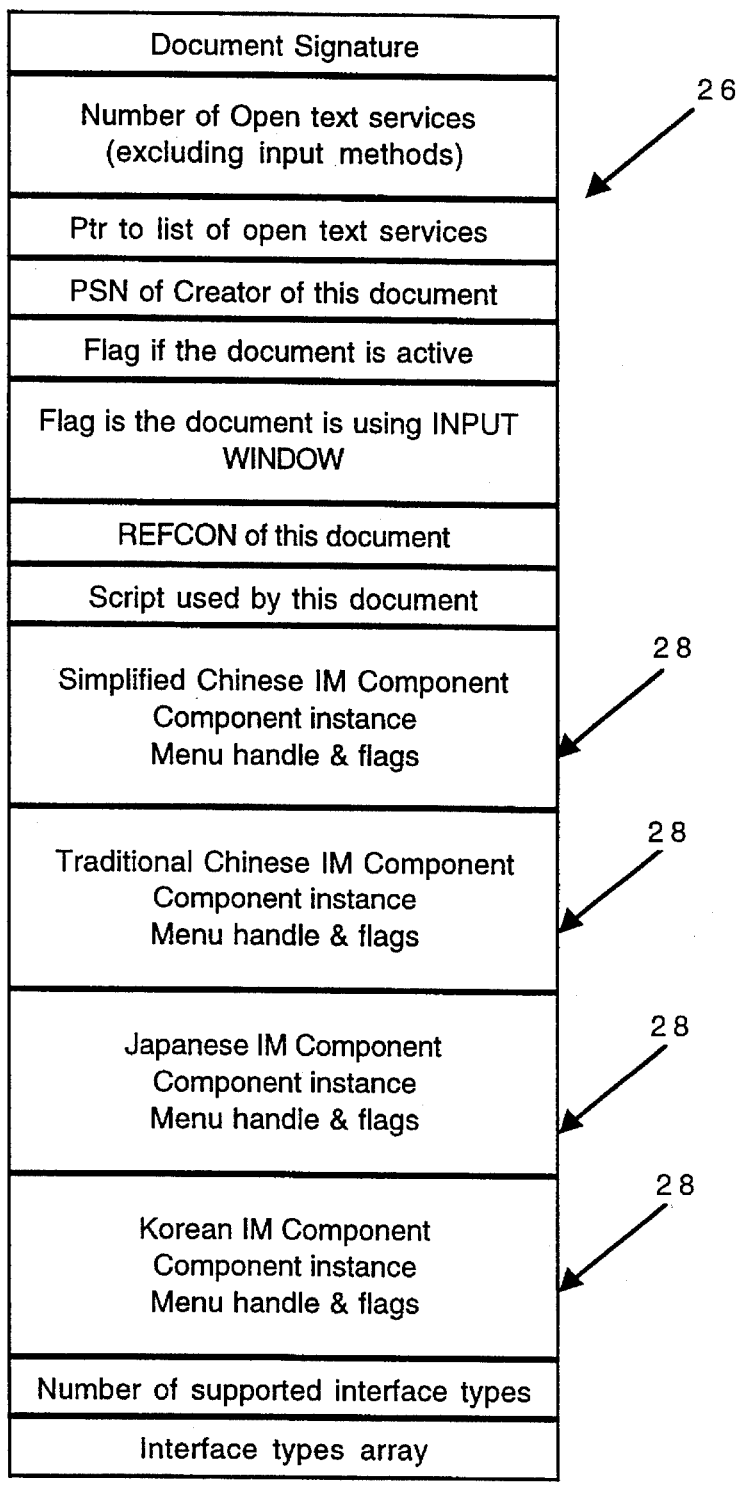

Each TSM document ID correspond to a TSM document 26. As shown by FIG. 9E, the TSM document 26 is used to identify the input methods 28 and text services 30 associated with each application, and more particularly, with each open working window. The first field of the TSM document 26 comprises the document signature or ID. The second field stores a value representing the number of text services 30 open. This number only includes text services 30 and does not account for any language input methods 28 that are opened. The third field comprises a pointer to a linked list of opened text services 30. The next field stores the PSN for the application that created this TSM document 26. This field is used as double check to the Table of TSM Documents 24. The fourth and fifth fields of the TSM document 26 are used to store flags indicating whether this document 26 is active, and whether this document 26 uses the input window, respectively. The seventh field stores a value for identifying the script language used by the document. The next four fields are used to identify whether an input method 28 for simplified Chinese, traditional Chinese, Japanese or Korean, respectively, is open. Each of these fields store an input method component ID, a component instance if the input method is open, and menu handles and other flags. This structure advantageously allows an input method 28 for each script to be open simultaneously although only one of the input methods is active. Finally, the TSM document or record 26 comprises two additional fields for listing the number of type faces supported and an array of type faces.

While the input methods 28 are specifically enumerated as part of the TSM document 26, the TSM document 26 uses a pointer to identify associated text services 30. As noted above, the pointer is stored in the third field of the TSM document 26. The associate text services 30 are preferably stored in a linked list of records. The preferred format for the records is shown in FIG. 9D. Each record preferably comprises seven fields. The first field is used to store a pointer to the next text service 30, if any. The second and third fields are used to identify the text service component and the instance of the text service component. The fourth field stores the primary script language. There are two additional fields for flags determining if the text service should take any active inputs and a flag for displaying the menu. The final field stores any associated menus. While the preferred embodiment for the structure of TSM global and other structures 15 has been outline above with reference to FIGS. 8 and 9, those skilled in the art will realize that the organizational hierarchy of FIG. 8 is by way of example and that the functionality achieved by the hierarchy may be achieved by a variety of similar structures. Moreover, it should be understood that the organizational hierarchy of FIG. 8 can be modified to accommodate additional input methods as they become available. For example, the TSM document 26 structure may be modified to provide for other input methods 28 besides simplified Chinese, traditional Chinese, Japanese and Korean.

The concept of a TSM Document 26 as described above is particularly advantageous because it provides a high level of abstraction for application developers. In other words, the application and application developers do not need to know which input method the user has selected, and they do not need to know exactly what happens or manage the opening, closing, activating, and deactivating of input methods as the user changes scripts and switches between windows. The management of the opening, closing, activating, and deactivating of input methods is performed by the TSM 10, and looks automatic to the application. The application need only request a particular action be performed by the TSM 10. Such actions that will be typically requested include: opening a TSM aware application; closing a TSM aware application; creating a TSM document; disposing of a TSM document; activating a TSM document; and, deactivating a TSM document.

Figure 2A:
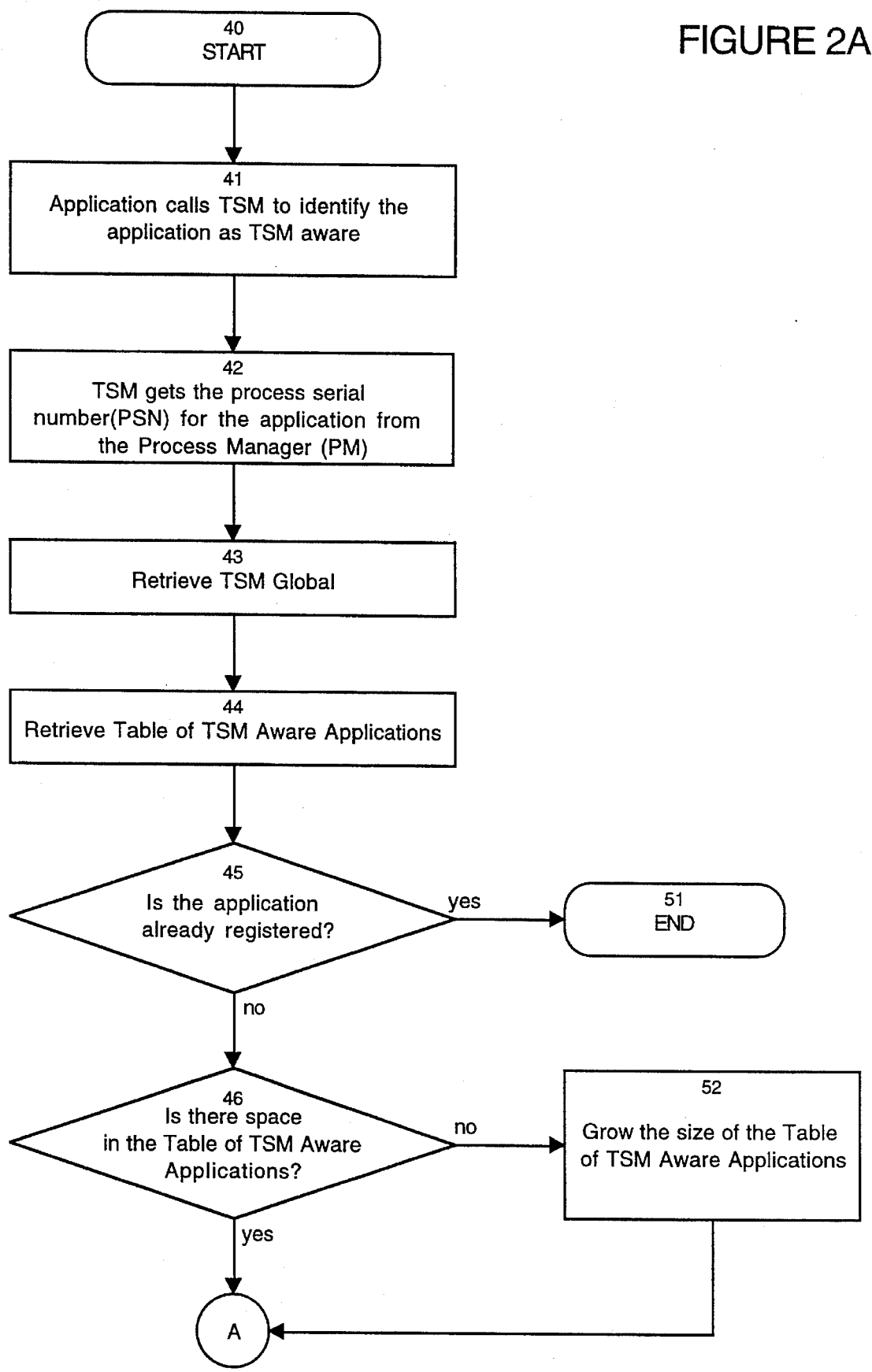
FIGS. 2A and 2B are flowchart of the preferred method for opening a TSM aware application according to the present invention.
Figure 2B:
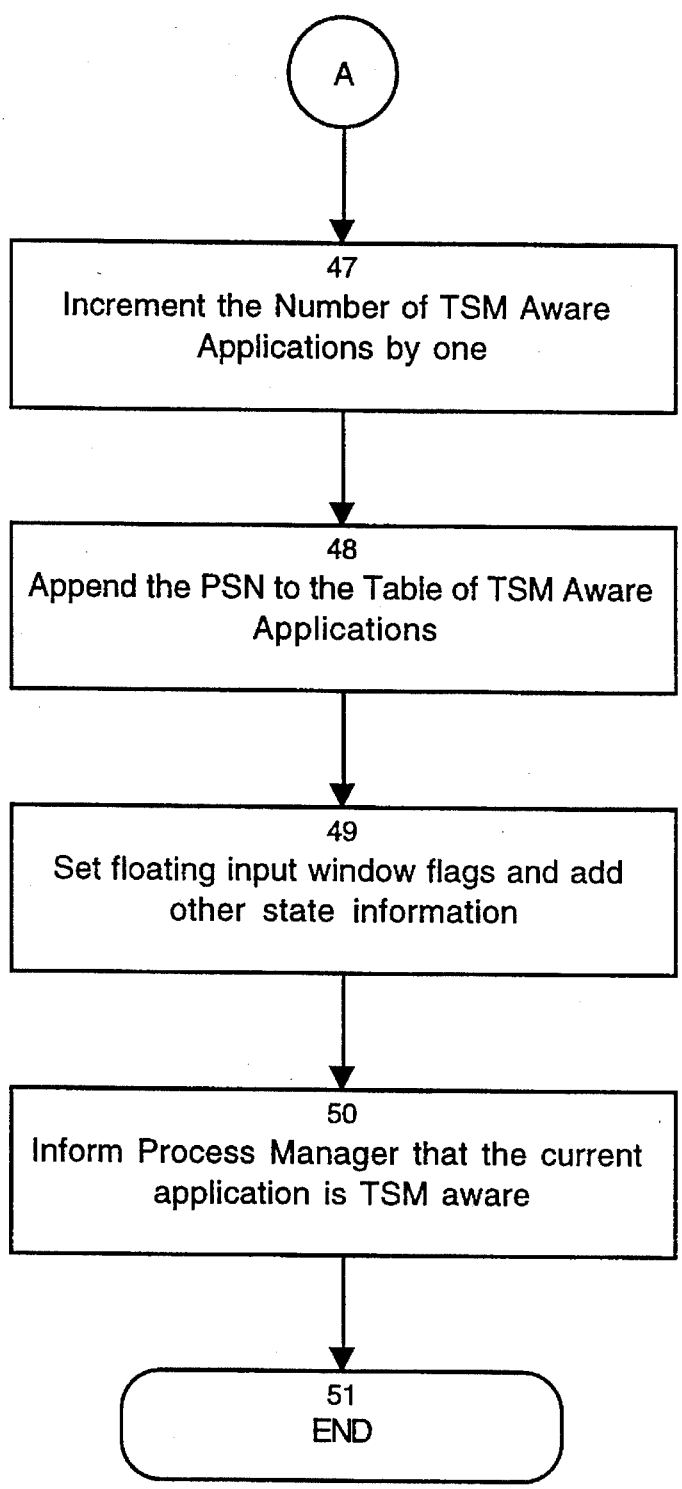

Referring now to FIGS. 2A and 2B, the preferred method for opening a TSM aware application will be described. The process begins in step 41, with the application 11 notifying the TSM 10 that the application 11 is TSM aware (the application uses the TSM 10 to process events). Then in step 42, the TSM 10 retrieves the PSN for the application 11 from the process manager. The process manager is a component of the system software that monitors all applications that are operational, and assigns them each a unique PSN. Next, in step 43 and 44, the TSM 10 retrieves the TSM global 20, and the Table of TSM Aware Applications 22, respectively. Then in step 45, the Table of TSM Aware Applications 22 is searched to determine if the application 11 is already registered. If the application 11 is already registered, then its PSN has already been stored in the table 22, no further action is necessary, and the process ends in step 51. However, if the TSM 10 determines that the application 11 has not been registered, the process continues in step 46. In step 46, the preferred method determines whether there is enough space to add another application 11 in the Table of TSM Aware Applications 22 by comparing the first two fields of the table 22. The first two fields identify the number of registered applications and the table size. If there is insufficient space, the process grows the size of the table 22 in step 52 and the continues to step 47. On the other hand, if there is space, the method proceeds directly to step 47 where the number of TSM aware applications, the first field, is incremented. Then in step 48, the PSN for the application is added to the table 22. In step 49, the floating input window flags and other information are added to the sub-fields of table 22 corresponding to this application. Finally in step 50, the process manager is informed that the current application is TSM aware, and the process for opening a TSM aware application is complete.

Figure 3A:
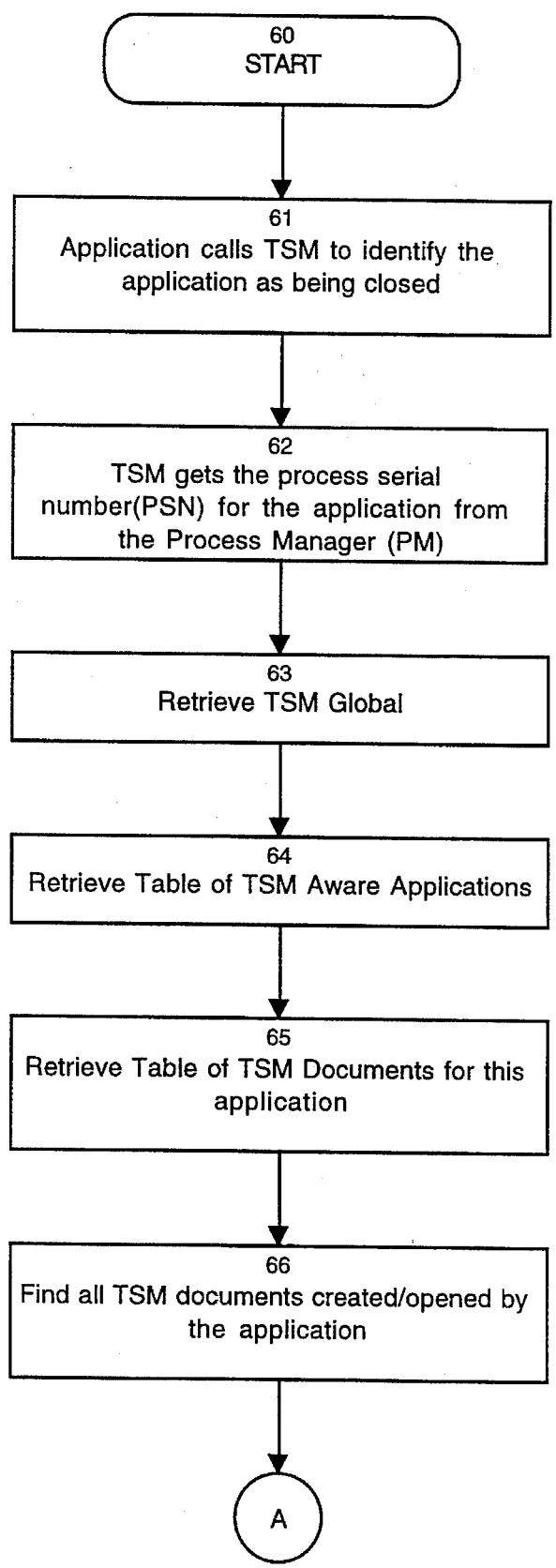
FIGS. 3A and 3B are a flowchart of the preferred method for closing a TSM aware application according to the present invention.
Figure 3B:
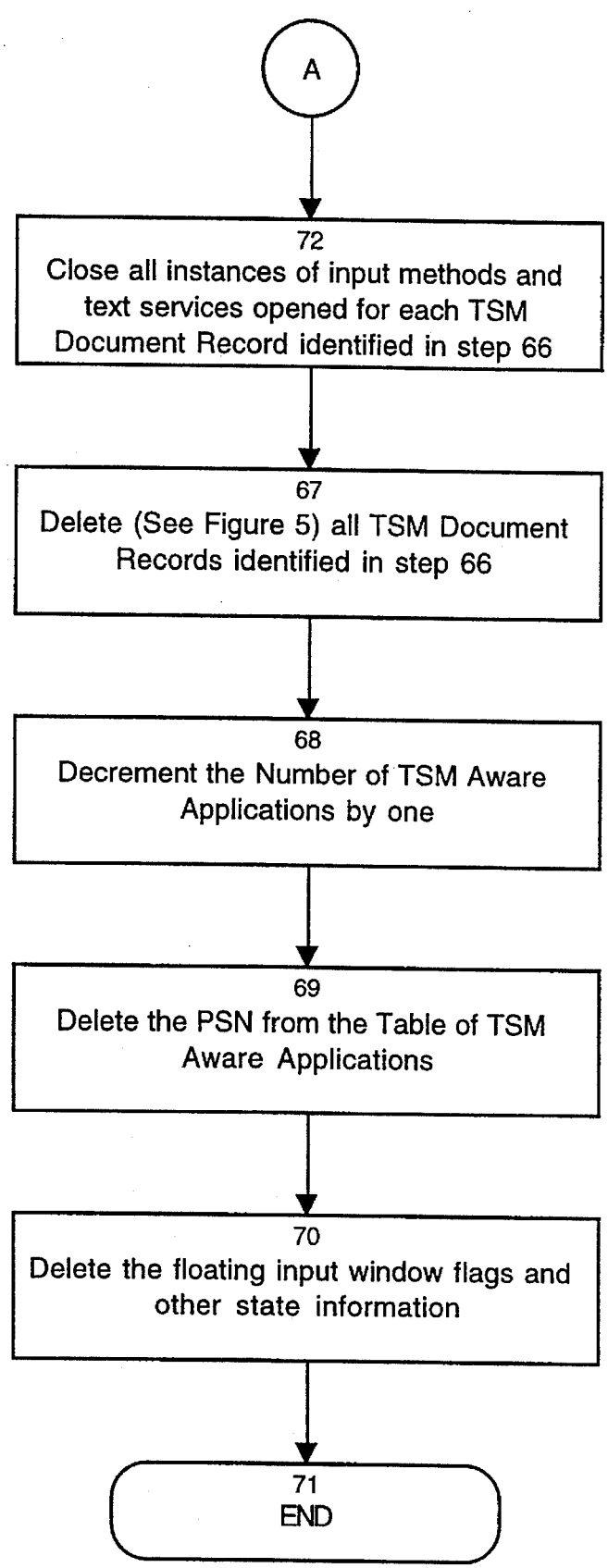

Referring now to FIGS. 3A and 3B, the process for closing a TSM aware application will be described. The process begins in step 60 with a request from the application to close a TSM aware application. In steps 62, 63, and 64, the preferred method performs steps identical to steps 42, 43, 44, respectively, to identify the Table of TSM Aware Applications 22. Next, in step 65, the preferred method retrieves the Table of TSM Documents 24 corresponding to the application identified in step 62. Then in step 66, the Table of TSM Documents 24 is used to find all the TSM documents 26 created or opened by this application. Then in step 72, all the opened instances of input methods 28 and text services 30 for each TSM document 26 identified in step 66 are closed. Next in step 67, all the TSM document records 26 identified in step 66 are deleted. The process for deleting documents 26 will be described in more detail below with reference to FIG. 5. In step 68, the number of TSM aware applications is decreased by one. The process continues in step 69, where the PSN for the application identified in step 62 is deleted from the Table of TSM Aware Applications 22. Then in step 70, the corresponding floating input window flags and other state information are deleted from the Table of TSM Aware Applications 22, and the process ends in step 71.

Figure 4A:
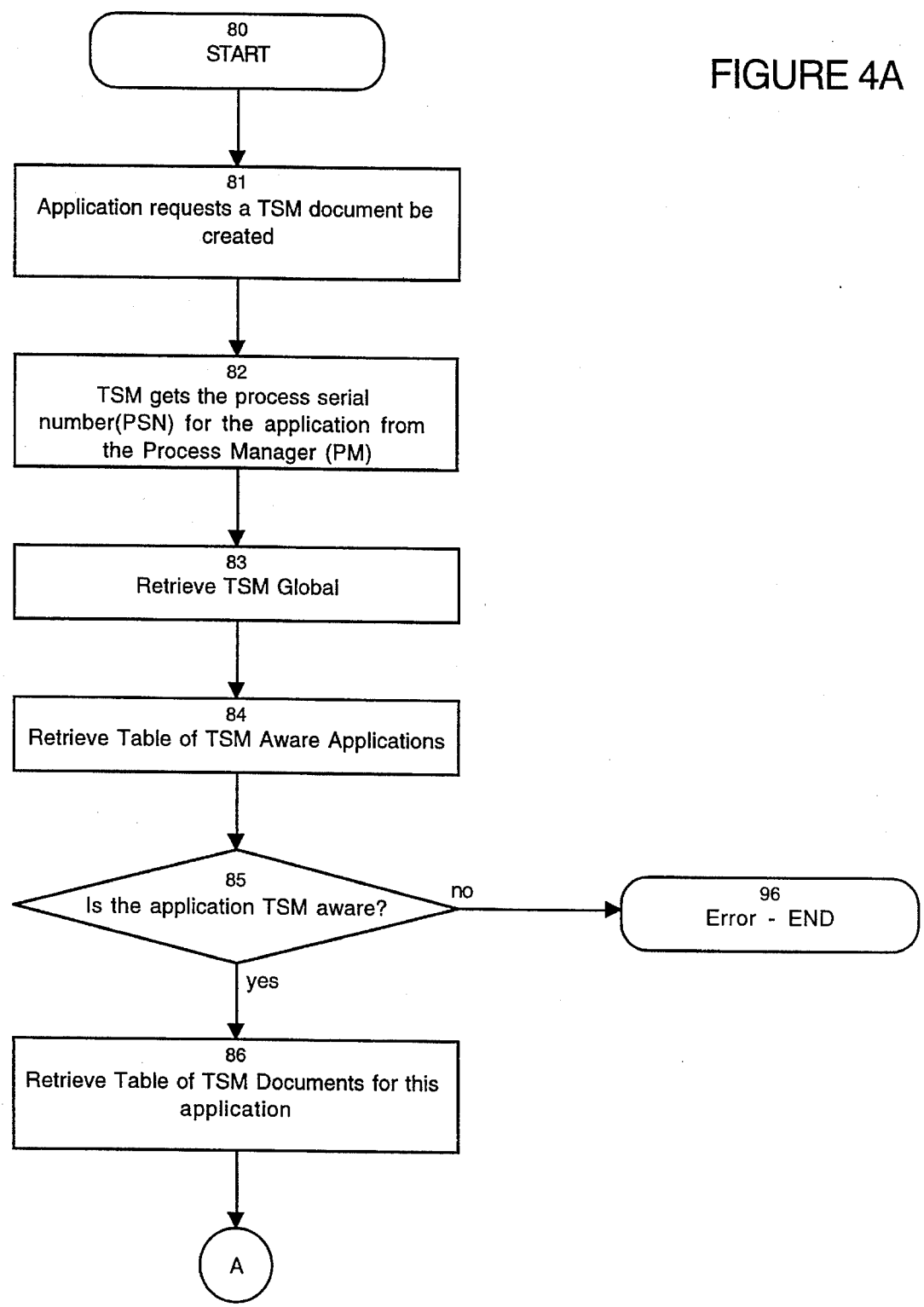
FIGS. 4A, 4B, and 4C are a flowchart of the preferred method for creating a TSM document according to the present invention.
Figure 4B:
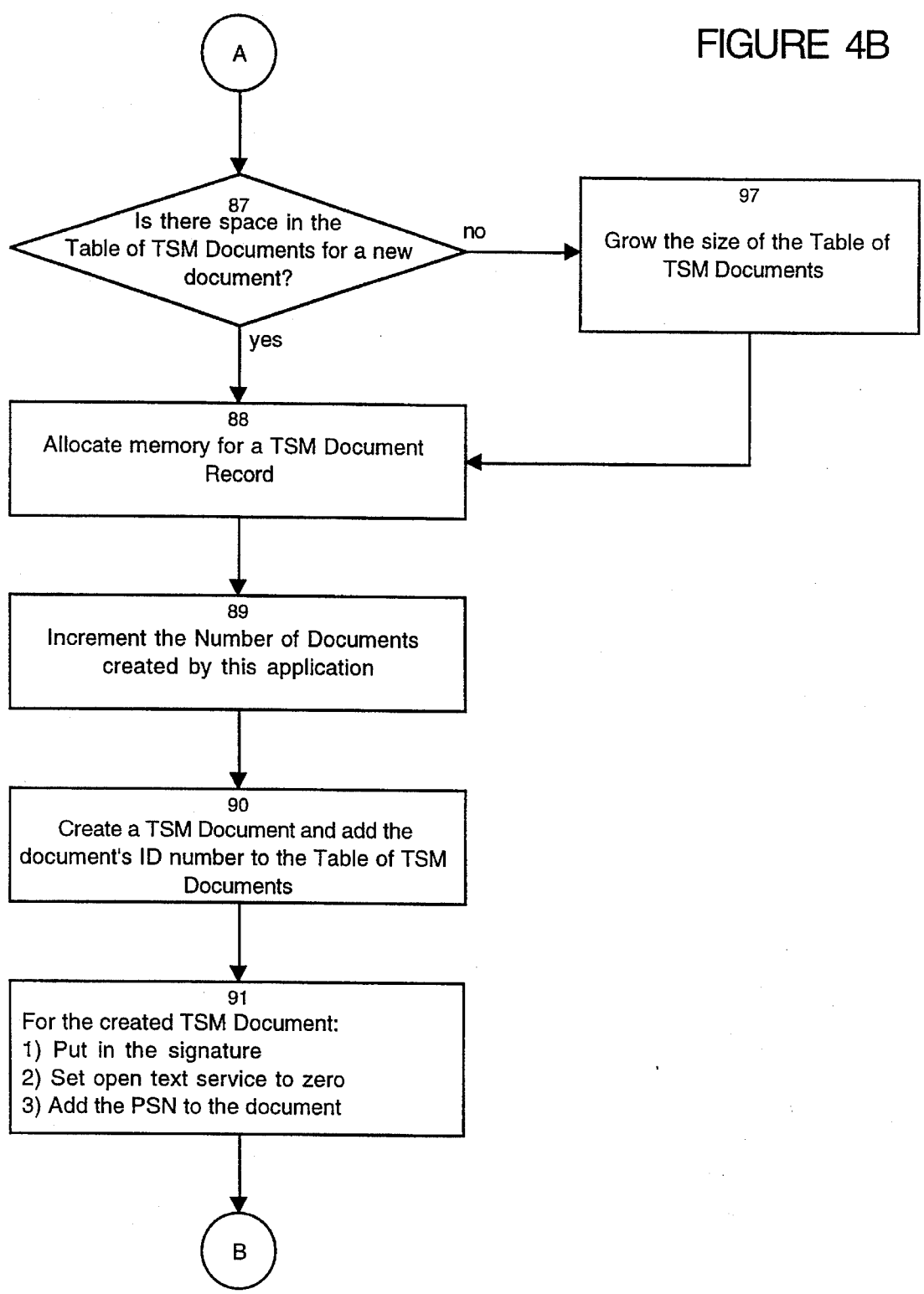
Figure 4C:
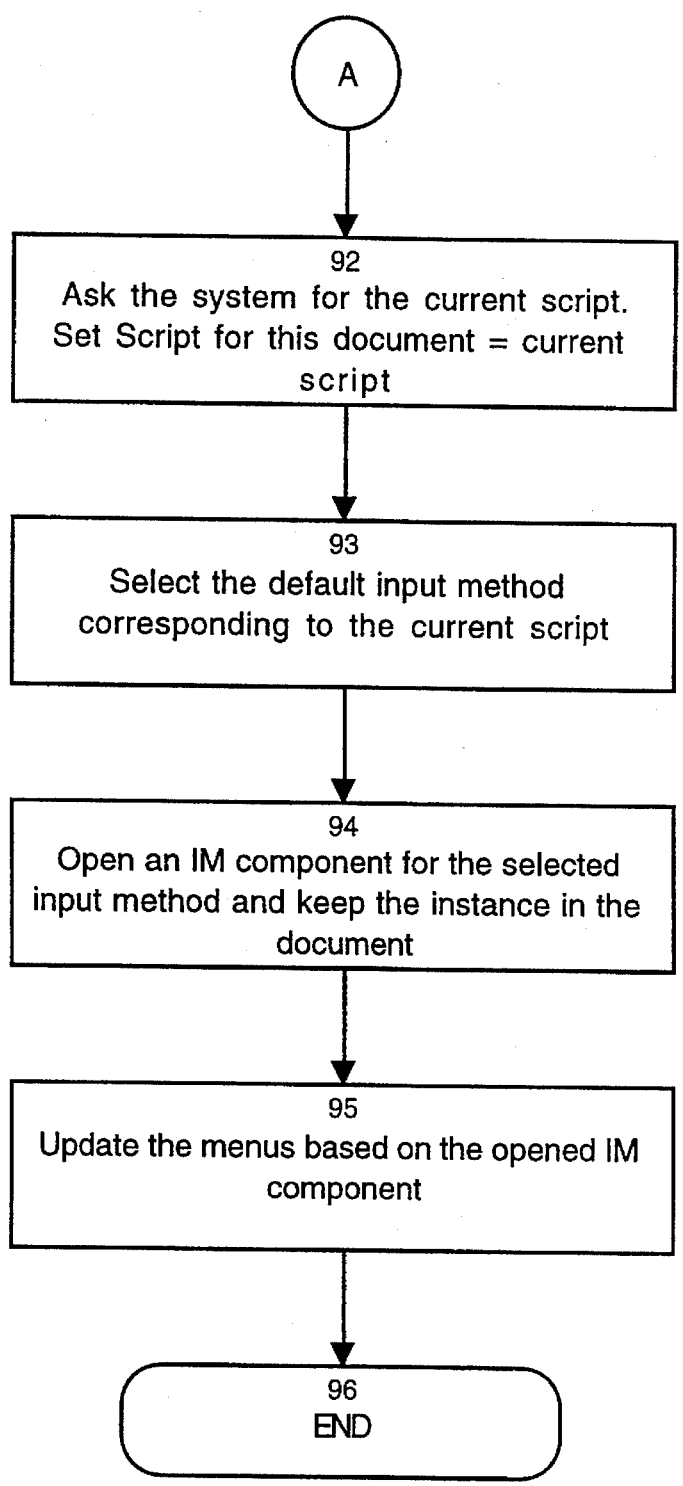

Other critical processes for the operation of the high level concept of the TSM document include the creation and deletion of TSM documents 26. By creating additional TSM documents 26, each application is able to maintain multiple instances of the same input method with each instance corresponding to a window being displayed by the system. FIGS. 4A–4C show a preferred method for creating a TSM document 26. The process for creating a TSM document 26 begins in step 80. In step 81, an application requests that a TSM document 26 be created. In step 82–84, the steps for identifying the application and Table of TSM Aware Applications 22 are performed. Next in step 85, the preferred method tests whether the application is TSM aware. This can be done by searching for the PSN of the application in the Table of TSM Aware Applications 22. If the PSN is not present, the application is not aware. If it is determined that the process in not TSM aware in step 85, an error message is provided and the process ends in step 96. However, if the application is TSM aware, the method continues in step 86 by retrieving the Table of TSM Documents 24 corresponding to the identified application. Next, in step 87, the method determines whether there is space in the Table of TSM Documents 24 for another document. This can be done by comparing the table size of the Table of TSM Documents 24 to the number of TSM documents as known from the first field of the table 24. If there is not enough room in the table 24, the size of the table 24 is increased, and the process continues to step 88. On the other hand, if there is space the method continues directly to step 88. In step 88, additional space in memory is allocated for the new document record about to be created. In step 89, the number of documents created by this application (first field in Table of TSM Documents 24) is incremented by one. Next, in step 90, a new TSM document record 26 is created and the document signature (i.e., ID number) for the newly created document 26 is stored in the Table of TSM Documents 24. The method then begins to initialize the newly created document 26. In step 91, the document signature is stored in the first field of the document record 26, the open text services is set to zero, and the PSN of the application is stored in the document record 26. Next in step 92, the current script is determine by asking the process manager, and the script for the document 26 is set to be the same as the current script. This is done by storing the code for the current script in the document record. In step 93, the default input method corresponding to the current script is determined. The default input method can be determined by accessing the fields in the TSM global 20. Once the default input method has been determined, the corresponding input method component for the selected default input method is opened and one instance of the input method is stored in the document record. For example, if the current script is Japanese, then the preferred method would determine the default input method corresponding to Japanese, open an instance of the input method/component corresponding to Japanese and store the input method in the newly created document. Finally, the method for opening a TSM document completes by updating the menus according to the menu handles and other state information for the input method component that was just opened.

Figure 5A:
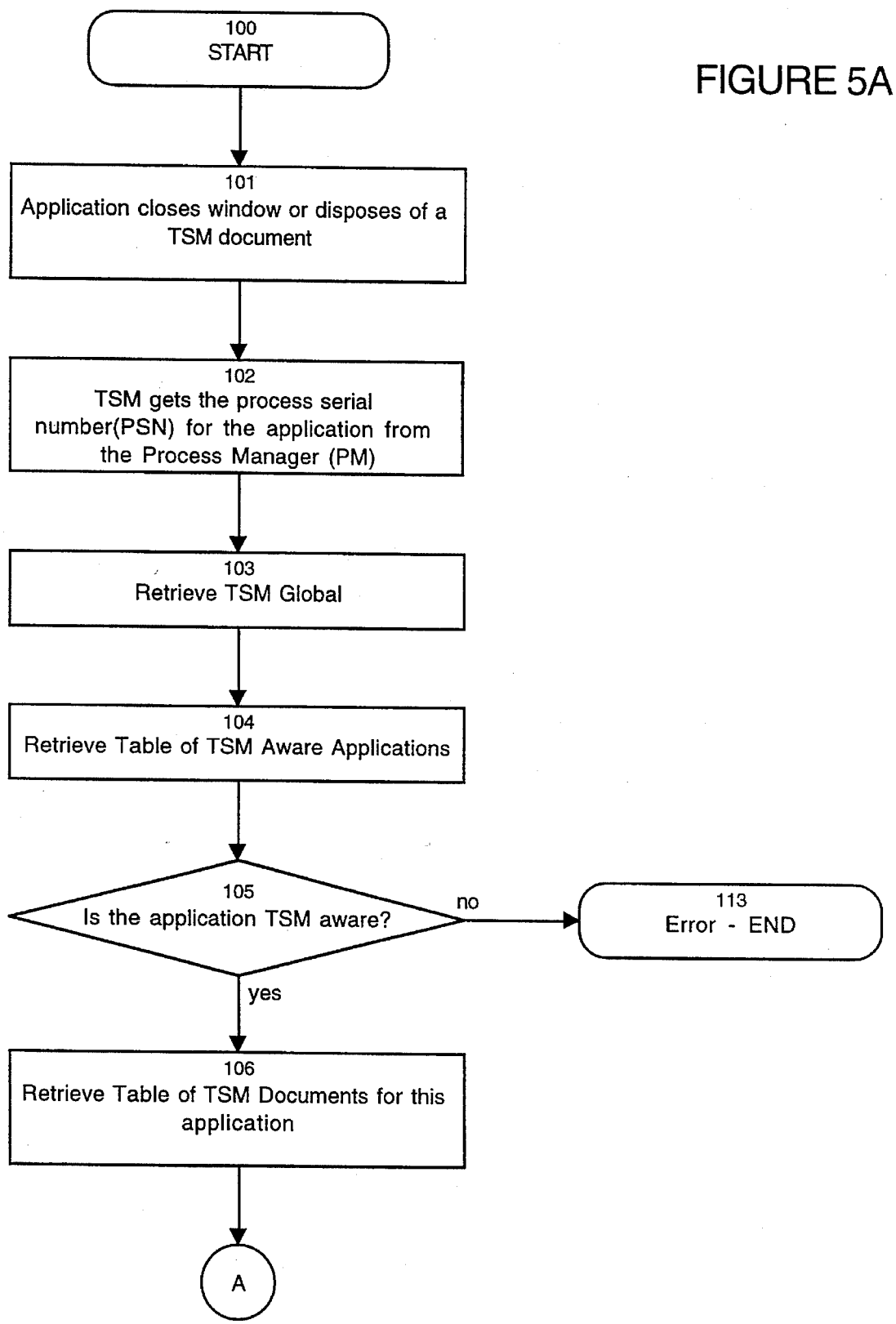
FIGS. 5A and 5B are a flowchart of the preferred method for disposing of a TSM document according to the present invention.
Figure 5B:
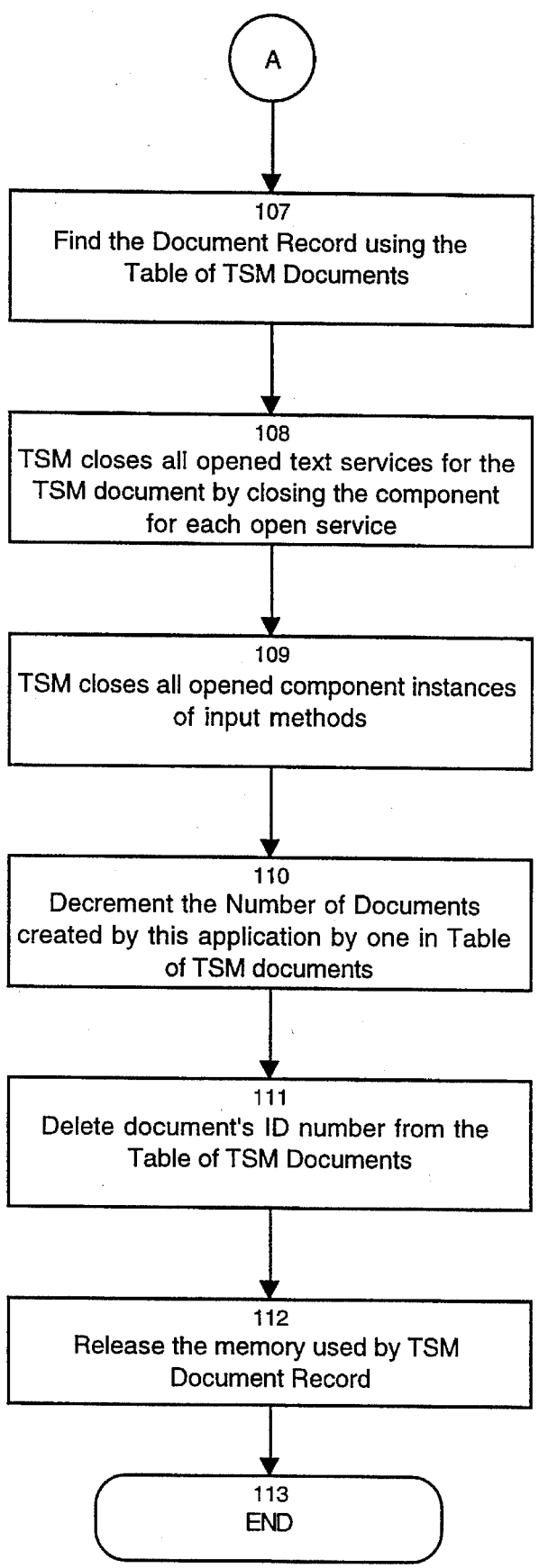

FIGS. 5A and 5B show a preferred method for deleting or disposing of a TSM document. The method begins in step 101 with a request from the application to delete a TSM document 26 or upon the closing of a window. The preferred method then performs identification steps as with the creation of a document 26 to determine if the application is TSM aware and determine the document table 24 corresponding to this application. The Table of TSM Documents 24 for this application is then retrieved in step 106. Then in step 107, the document record 26 corresponding the window that was closed, or the document record 26 specified by the application for deletion is found. Next in step 108, the TSM 10 closes all opened text services 30 for the TSM document 26 by determining each component through the linked list, and closing the component for each opened text service 30. Then in step 109, TSM 10 closes all opened component instances of input methods 28. The number of TSM documents created by this application in the Table of TSM Documents 24 is decrement by one in step 110. Then, the document's ID number is deleted from Table of TSM Documents 24 in step 111. Finally, the memory allocated and used by the TSM document record 26 is released in step 112 and the process ends in step 113.

Figure 6A:
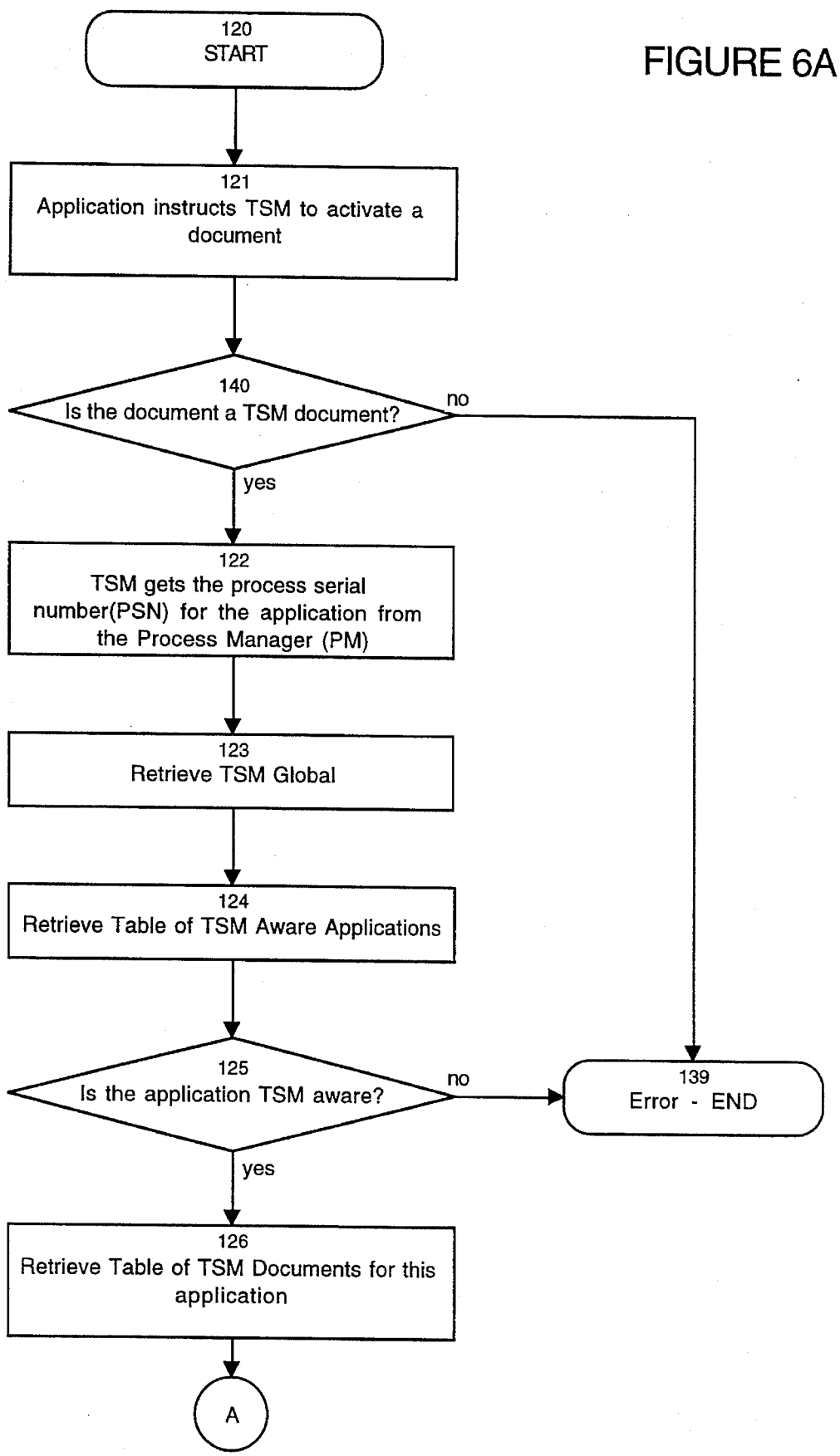
FIGS. 6A, 6B, and 6C are flowcharts of the preferred method for activating a TSM document according to the present invention.
Figure 6B:
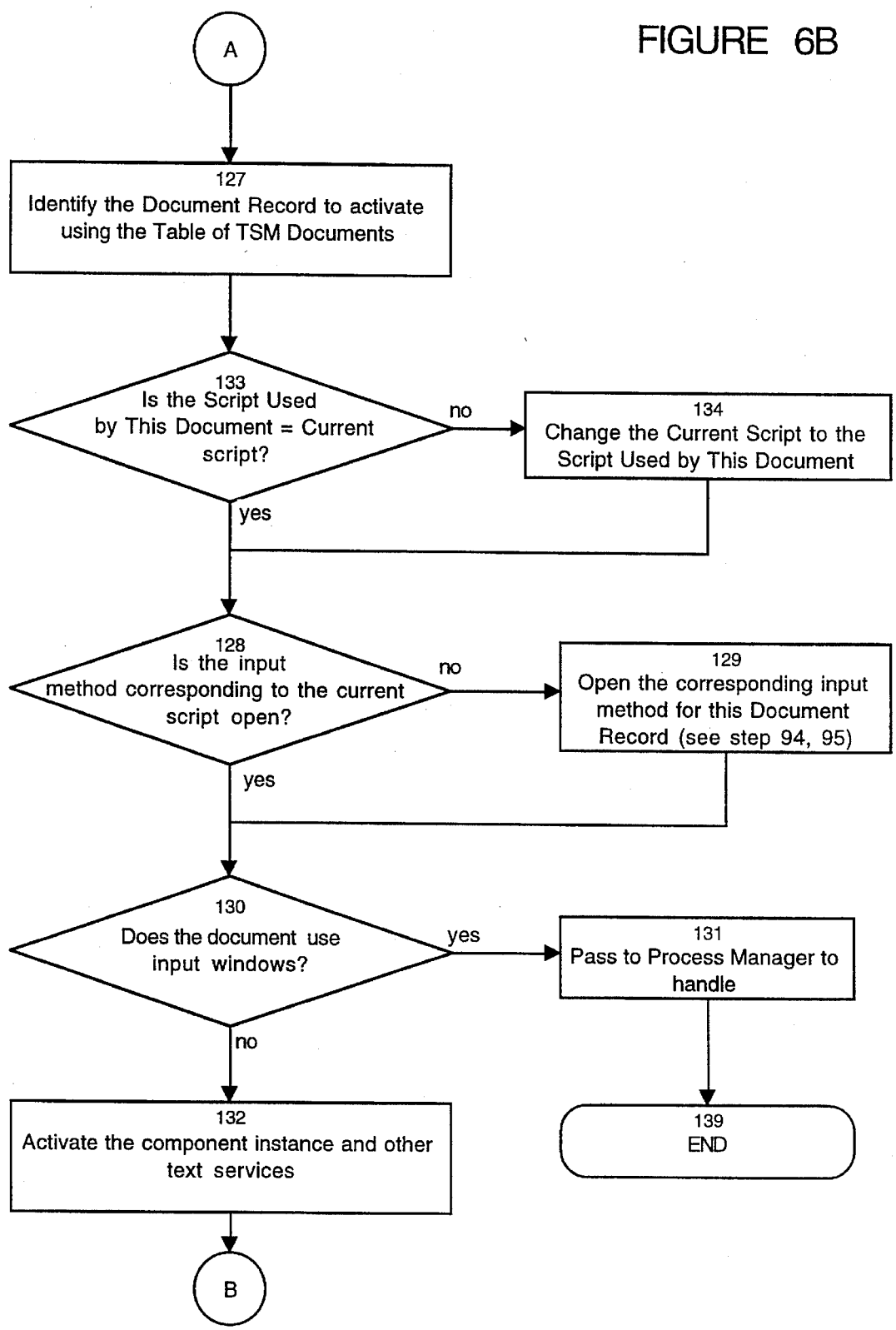
Figure 6C:
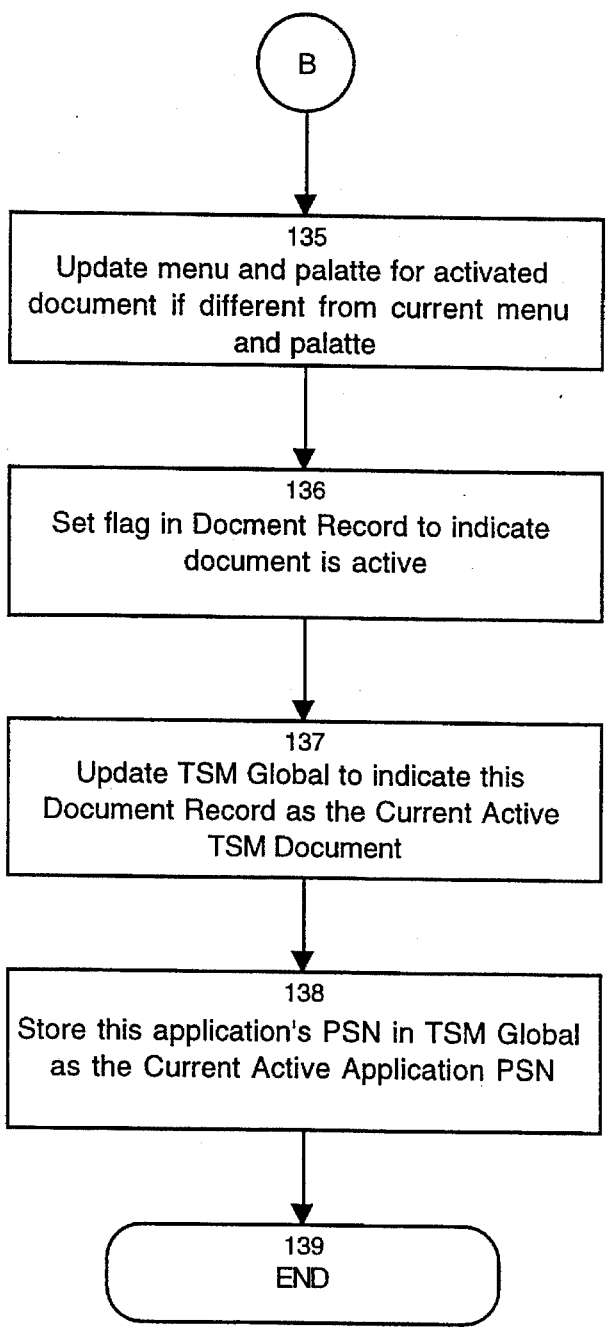

Referring now to FIGS. 6A–6C, the preferred process for activating a TSM document 26 will be described. The method begins in step 121 when the application instructs TSM 10 to activate a TSM document 26. The preferred method first verifies that the document specified by the application is a TSM document 26 in step 140. When the application calls the TSM 10, it provides an address to a memory location containing the document. Initial information at that address identifies the document as a TSM document 26. If the document is not a TSM document 26, the process ends with an error in step 139. If the document is a TSM document 26, the process continues in step 122. The preferred method then performs identification steps as have been described above to determine if the application is TSM aware, and retrieves the Table of TSM Documents 24 corresponding to this application in step 126. Then, the TSM 10 identifies the TSM document record 26 to activate using the Table of TSM Documents 24, in step 127. Next in step 133, the process determines whether the script used by the document, as set in a field of the TSM document 26, is same as the current script, as set in the TSM global 20. If they are the same the method proceeds directly to step 128. Otherwise, the process continues first to step 134 to change the current script to the script for this document 26, and then to step 128. In step 128, the TSM 10 tests whether the input method of the TSM document 26 corresponding to the current script, as determined from the TSM global 20, is open. If the input method is open, the preferred method proceeds directly to step 130. If not, then the TSM 10 first opens an instance of the input method corresponding to the current script (as described above with reference to steps 94, 95), then proceeds to step 130. In step 130, the TSM 10 tests whether the document 26 uses input windows. This can be determined by reviewing the flags for the document 26. If the document 26 does use input windows, the process is passed to the process manger for further handling the method ends in step 139. However, if the document 26 does not use input windows, the method activates the component instance and other text services for this document 26 in step 132. Next, in step 135, the menu and palettes for the input method of the active document are updated if they are different from the menu and palettes currently used by the system. Next in step 136, the document active flag in the TSM document record 26 is set. Then in step 135, the Current Active TSM Document field in the TSM global 20 is updated to indicate that this TSM document record 26 is currently active. Finally, in step 138, the PSN for the current application is stored in the Current Active Application PSN field of the TSM global 20, and the process ends in step 139.

Figure 7A:
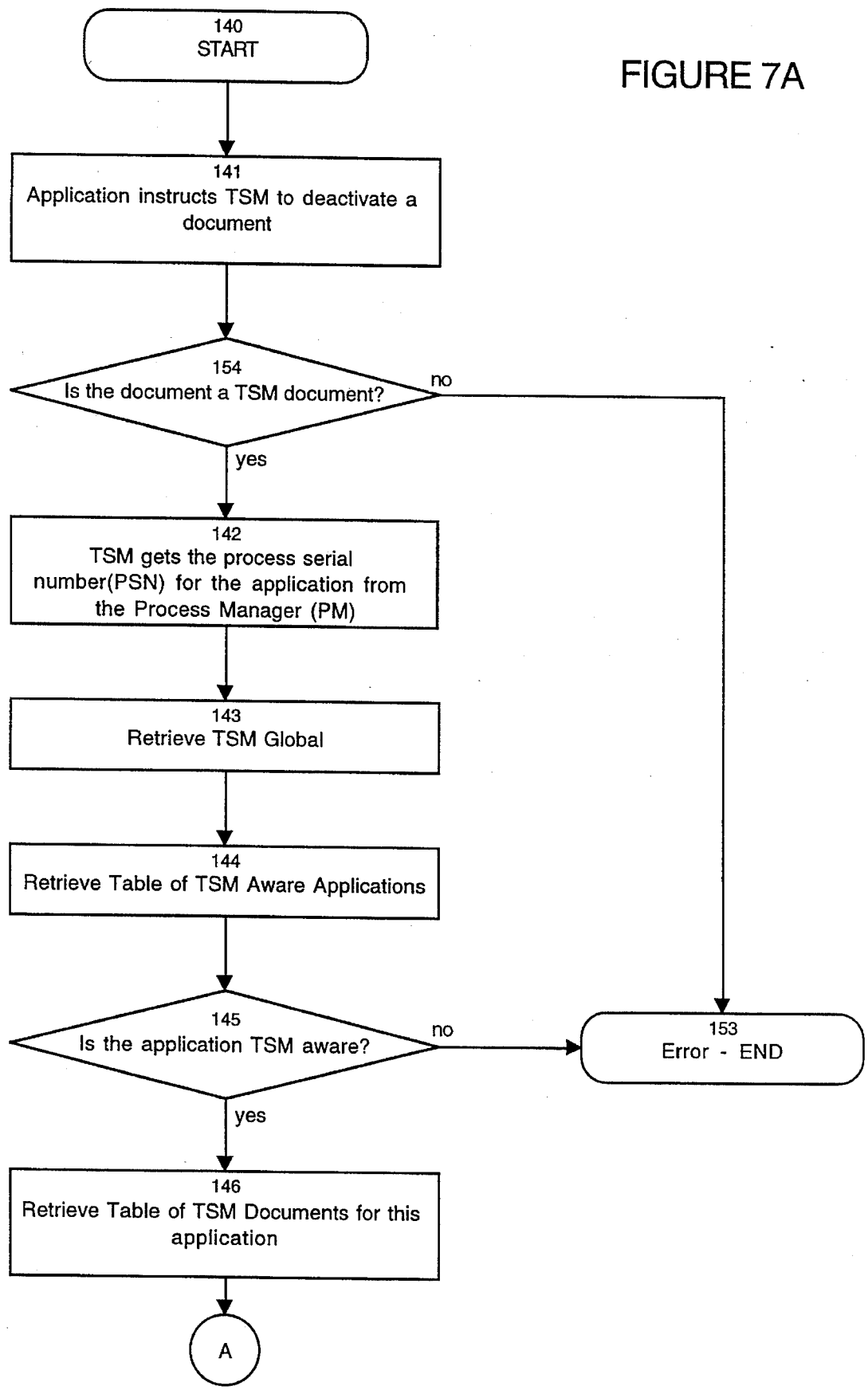
FIGS. 7A and 7B are flowcharts of the preferred method for deactivating a TSM document according to the present invention.
Figure 7B:
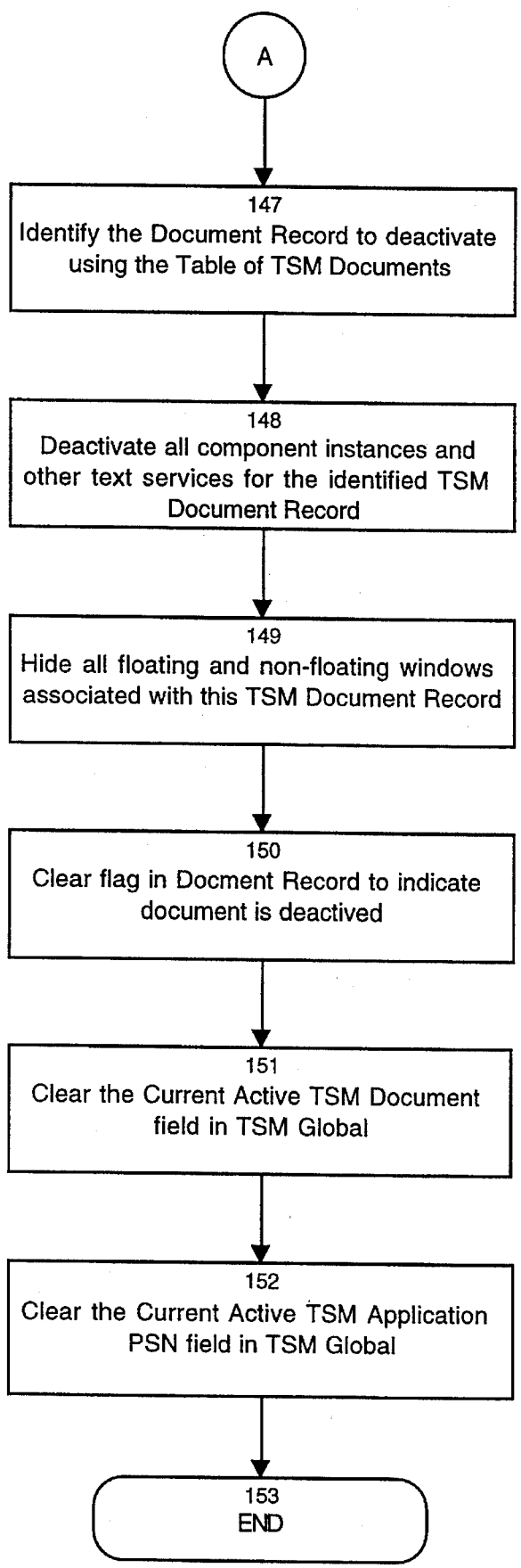

Referring now to FIGS. 7A and 7B, the preferred process for deactivating a TSM document 26 will be described. The method begins in step 141 when the application instructs TSM 10 to deactivate a TSM document 26. Then the method verifies that the document to deactivate is a TSM document 26 in step 154. If it is not a TSM document 26, the process end in step 153, otherwise the process continues in step 142. The preferred method then performs identification steps as have been described above to determine if the application is TSM aware, and retrieves the Table of TSM Documents 24 corresponding to this application in step 146. Then, the TSM 10 identifies the TSM document record 26 to deactivate using the Table of TSM Documents 24, in step 147. In step 148, all the component instances of the input methods 28 and other text services 30 for the identified TSM document record 26 are deactivated. Then, all floating and non-floating windows associated with the identified TSM document record 26 are hidden in step 149. Next in step 150, the Active Document Flag in the document record 26 is cleared. The document record 26 is then deleted from the TSM global 20 in step 151 to clear the Current Active TSM Document field. Similarly, the application's PSN is deleted from the TSM global 20 in step 152 to clear the Current Active Application PSN field. The deactivation process is then ends in step 153.

The concept of a TSM document as has been described above, along with the operations for creating, deleting, activating, and deactivating TSM documents are particularly advantageous because the burdens on the application programmer of having to manage input methods and component instances as well as their protocols are eliminated. The application or application programmer does not know or need to know what happens when a TSM document is deleted, created, activated or deactivated. The TSM 10 has all the responsibility for managing the input methods and using them with the data and events provided by the application. For example, when a user creates a new working document, the application simply must request that the TSM 10 create a new TSM document. When a user brings a window to the front, the all the application has to do is request that the TSM activate the TSM document associated with the window. Similarly, if an application deactivates a window, it also requests that the TSM 10 deactivate the corresponding TSM document. If a window is closed, the application deletes the window, and only has to request that the TSM delete the corresponding TSM document. Thus, the programming with the TSM and the concept of a TSM document is greatly simplified.

The concept of the TSM document and its associated hierarchy are also advantageous because they provide for multiple instances of the same input method. When a TSM document is created, the TSM opens an instance of the input method for the TSM document (see steps 93–95 above). Each instance of the input method advantageously maintains its own buffer and local states. Thus, an application can open multiple instances of the same input method corresponding to windows opened by the application. In other words, each TSM document can have an instance of an input method open. If several TSM documents all utilize the same input method, the TSM 10 advantageously maintains multiple instances of the same input method, one instance of the input method corresponding to each TSM document. For example, the user can begin typing in window A using a Japanese input method, and without completing the typing or conversion process, the user can switch to window B and type something else using the same Japanese input method. The user can then return to window A, and complete the original typing or conversion process. Once the user returns to window A, the process will continue as if the user had never left window A. Since there is separate TSM document corresponding to window A and a separate TSM document corresponding to window B, the two windows, although using the same input method, can maintain totally independent active input areas. This process of maintaining multiple instances of the same input method is easily accomplished with the TSM document hierarchy of the present invention. When window A is opened, a first TSM document is created; and when window B is opened, a second TSM document is created. When the user begins typing, the document corresponding to window A is activated. Then when user switches from window A to window B, the application simply tells the TSM 10 to deactivate the TSM document corresponding to window A, and activate the TSM document corresponding to window B. When the TSM document corresponding to window A is deactivated, the states of the instance of the input method are advantageously stored. Then the user inputs data with the input method instance corresponding to the TSM document associated with window B. When user switches to back to Window A, the application tells the TSM 10 to deactivate the TSM document corresponding to window B, and activate the TSM document corresponding to window A. The states saved before deactivation are restored, and the user can continue to input information as if the window were never activate/deactivated. Therefore, the system and method of the present invention allow for multiple instances of any input method. The only limitation on the number of instances is the number of TSM documents that may be created.

Another advantageous feature of the present invention is that the TSM 10 automatically synchronizes the input method used by the system to the input method assigned to the TSM document. As has been described above, the data structure used for the TSM document advantageously allows one input method component instance to be opened per script, and also identifies the script used by the document. Thus, as the user switches between different windows, and thus, different TSM documents, the input method used for each window is automatically synchronized when the TSM document for the window is activated. For example, assume the user is typing Chinese in a first window using input method C1, and then types Korean in a second window using an input method K3. When the user switches from the second window back to the first window, the TSM 10 automatically changes the script from Korean to Chinese. The TSM document associated with the second window is deactivated and the TSM document associated with the first window is activated. Since the C1 input method is opened for the TSM document corresponding to the first window it is automatically reactivated. Thus, the user may type in the first window and it will be in the Chinese script and use input method C1 without having to make any further adjustments. Moreover, it should be understood that since each document can have an input method for each script open, the TSM document and the TSM are able to restore the input method to the state it was in just before deactivation.

The present invention also automatically synchronizes input methods when the user changes scripts within the same document. The structure of the TSM document permits up to four input methods, one per script, to be specified. Therefore, as the user switches between scripts in the same TSM document, the TSM automatically maintains the synchronization of the input methods. For example, assume the default input method for Chinese is C1 and the default input method for Japanese is J2 as specified in the TSM global 20. If the user begins by editing a document with a Chinese script. When the application creates the TSM document, the TSM opens an instance of the default Chinese input method, in this case C1. Later, the user wants to insert a Japanese paragraph into the same Chinese document, so the user changes the script to Japanese. Then the TSM 10 automatically deactivates the instance of C1, and opens an instance of the default Japanese input method, J2 (If it has not already been opened). The TSM 10 then activates the instance of J2. If the user switches back to the Chinese script, the TSM 10 automatically deactivates the instance of J2, and activates the same instance of C1 which was used before by the TSM document. This automatic synchronization between input methods further simplifies the ease of use of the present invention for programmers by eliminating another aspect of the input method that previously needed to be considered and monitored.

While the present invention has been described with reference to certain preferred embodiments, those skilled in the art will recognize that various modifications may be provided. For example, different algorithms may be used to implement the opening. deleting, activating, and deactivating of TSM documents in accordance with the present invention. These and other variations upon and modifications to the preferred embodiment are provided for by the present invention which is limited only by the following claims.

What is claimed is:

1. A system for managing and maintaining communication between an application and a plurality of input methods via a component manager, said system comprising:

a memory means for storing a plurality of Text Services Manager (TSM) documents, each of the TSM documents identifying a corresponding application, and an instance of a corresponding input method; and a dispatcher for receiving and transmitting signals between the application and the component manager, the dispatcher coupled to receive signals from and transmit signals to the application, the dispatcher coupled to receive signals from and transmit signals to the component manager, the dispatcher also coupled to the memory means to access the plurality of TSM documents to determine the input method that is to receive signals sent from the application, and to determine the application that is to receive signals sent from an input method through the component manager to the dispatcher.

2. The system of claim 1, wherein the memory means further comprises:

a table of TSM aware applications; and a table of TSM documents for each application in the table of TSM aware applications;

wherein the TSM documents are organized in the table of TSM documents according to the application that created the TSM document;

wherein a portion of the memory means stores a TSM global having values indicating an active application, an active TSM document, and a default input method.

3. In a system having a process manager, a plurality of input methods, and a text services manager comprising a Text Services Manager (TSM) global memory, a table of applications, a plurality of tables of TSM documents, and a plurality of TSM document records; a method for initiating use of the text services manager by an application, said method comprising the steps of:

identifying an application that will communicate using the text services manger;

retrieving a serial number for the identified application from the process manager of the system;

retrieving the table of applications;

searching for the serial number of the identified application in the table of applications;

storing the serial number for the application in the table of applications if the serial number is not found; and notifying the process manager that the application will communicate using the text services manger.

4. The method of claim 3, wherein the step of retrieving the table of applications, further comprises the sub-steps of:

accessing the TSM global memory; and using a pointer in the TSM global memory to determine the location of the table of applications.

5. The method of claim 3 further comprising, after the step of retrieving the table of applications, the step of determining whether there is enough space in the table of applications to add the application, and increasing the size of the table of applications if there is not enough room for the application in the table of applications.

6. In a system having a process manager, a plurality of input methods, and a text services manager comprising a Text Services Manager (TSM) global memory, a table of applications, a plurality of tables of TSM documents, and a plurality of TSM document records; a method for ending use of the text services manager by an application, said method comprising the steps of:

identifying the application that will no longer use the text services manager;

retrieving a serial number for the identified application from the process manager of the system;

retrieving the table of TSM documents corresponding to the identified application;

finding the TSM documents created by the identified application;

deleting the TSM documents found;

decrementing a number of applications in the table of applications by one; and deleting the serial number of the identified application from the table of applications.

7. The method of claim 6, wherein the step of retrieving the table of TSM documents corresponding to the identified application, further comprises the sub-steps of:

accessing the TSM global memory;

using a pointer in the TSM global memory to determine a location of the table of applications;

retrieving the table of applications; and using a pointer in the table of applications to determine the location of the table of TSM documents corresponding to the identified application.

8. The method of claim 6 wherein the step of finding comprises: retrieving an address for each TSM document from the table of TSM documents for the identified application, and retrieving each TSM document located at the address.

9. The method of claim 6 wherein each TSM document has four input methods and a linked list of text services, and wherein the method further comprises the steps of:

closing each open instance of the four input methods;

updating the TSM document to reflect the closing of the input methods;

determining the opened text services by parsing the linked list;

closing the opened text services identified in the linked list; and deleting the text services from the linked list.

10. The method of claim 6 wherein the step of deleting the TSM documents found comprises the steps of:

identifying a TSM document to delete by an application;

retrieving a serial number for the application from the process manager of the system;

retrieving the table of TSM documents corresponding to the application;

finding the TSM document record using the table of TSM documents;

closing all opened text services for the TSM document by closing a component for each opened text service;

closing all opened input methods for the TSM document by closing instances of input methods opened for each input method;

removing the TSM document's identification number from the table of TSM documents; and releasing the memory used by the TSM document record.

11. In a system having a process manager, a plurality of input methods, a plurality of text services, and a text services manager comprising a Text Services Manager (TSM) global memory, a table of applications, a plurality of tables of TSM documents, and a plurality of TSM document records; a method for creating a TSM document, said method comprising the steps of:

receiving a request from an application to open a TSM document;

retrieving a serial number for the application from the process manager of the system;

retrieving the table of TSM documents corresponding to the application;

allocating memory for a new TSM document record;

creating the new TSM document record;

adding an identification number for the new TSM document record to the table of TSM documents;

determining a current input method being used by the system;

setting a default input method for the new TSM document equal to the current input method;

opening an instance of the input method corresponding to the default input method and saving it in the new TSM document record; and updating menus based on the opened instance of the input method.

12. The method of claim 11, wherein the step of retrieving the table of TSM documents corresponding to the application, further comprises the sub-steps of:

accessing the TSM global memory; and using a pointer in the TSM global memory to determine a location of the table of applications;

retrieving the table of applications; and using a pointer in the table of applications to determine a location of the table of TSM documents corresponding to the application.

13. The method of claim 11 further comprising, after the step of retrieving the table of TSM documents, the step of determining whether there is enough space in the table of TSM documents to add another document, and increasing the table size if there is not enough room for another document in the table of TSM documents.

14. The method of claim 11 further comprising, after the step of retrieving a serial number for the application, the step of verifying that the serial number for the application is listed in the table of applications, and discontinuing the method if the serial number for the application is not listed in the table of applications.

15. The method of claim 11, wherein the step of determining a current input method being used by the system further comprises the step of requesting information about the input method currently in use from the process manager.

16. The method of claim 11, wherein the step of determining a current input method being used by the system comprises the steps of:

receiving information about the input method currently in use from the process manager;

using the received information to select one of the default input method fields listed in the TSM global memory; and retrieving from the TSM global memory the value stored in the selected default input method field.

17. In a system having a process manager, a plurality of input methods, a plurality of text services, and a text services manager comprising a Global Text Services Manager (TSM) global memory, a table of applications, a plurality of tables of TSM documents, and a plurality of TSM document records; a method for deleting a TSM document, said method comprising the steps of:

receiving a request to delete a TSM document from an application;

retrieving a serial number for the application from the process manager of the system;

retrieving the table of TSM documents corresponding to the application using the serial number;

finding the TSM document record using the retrieved table of TSM documents;

closing all opened text services for the TSM document by closing a component for each opened text service;

18. The method of claim 17, wherein the step of retrieving the table of TSM documents corresponding to the application, further comprises the sub-steps of:

accessing the TSM global memory;

using a pointer in the TSM global memory to determine a location of the table of applications;

retrieving the table of applications; and using the serial number of the application to find a pointer in the table of applications that specifies the location of the table of TSM documents corresponding to the application.

19. The method of claim 17, further comprising, after the step of retrieving a serial number for the application, the step of verifying that the serial number for the application is listed in the table of applications, and discontinuing the method if the serial number for the application is not listed in the table of applications.

20. The method of claim 17 wherein the step of finding comprises:

retrieving an address for the TSM document from the table of TSM documents for the application, and retrieving the TSM document located at the address.

21. The method of claim 17 wherein the system provides four input methods, and wherein the step of closing all opened input methods comprises the steps of:

closing each open instance of the four input methods; and updating the TSM document to reflect the closing of the input methods.

22. The method of claim 17 wherein the TSM document has a linked list of text services, and wherein the step of closing all opened text services comprises the steps of:

determining the opened text services by parsing the linked list;

closing the opened text services identified in the linked list; and deleting the text services from the linked list as they are closed.

23. In a system having a process manager, a plurality of input methods, a plurality of text services, and a text services manager comprising a Text Services Manager (TSM) global memory, a table of TSM aware applications, a plurality of tables of TSM documents, and a plurality of TSM document records; a method of using a TSM document to establish communication between an application and an input method, said method comprising the steps of:

receiving a request from an application to use a TSM document;

retrieving a serial number for the application from the process manager of the system;

retrieving the table of TSM documents corresponding to the application;

identifying the TSM document record to use from the table of TSM documents;

determining a language used by the TSM document from data stored in the identified TSM document record;

comparing the language used by the TSM document to a language currently being used by the system;

changing the language currently being used by the system to the language used by the TSM document if they are not the same;

determining whether an instance of the input method for the language currently being used is open;

opening an instance of the input method corresponding to the language currently being used if an instance is not open;

activating the input method and the text services for this document;

updating a menu and a palette of the system to correspond to a type specified in the activated TSM document;

setting a flag in the TSM document record to indicate TSM document is in use; and updating the TSM global memory to identify the active TSM document and application.

24. In a system having a process manager, a plurality of input methods, a plurality of text services, and a Text Services Manager (TSM) comprising a TSM global, a table of TSM aware applications, a plurality of tables of TSM documents, and a plurality of TSM document records; method of using a TSM document to end communication between an application and an input method, said method comprising the steps of:

receiving a request from an application to end communication with an input method using a TSM document;

retrieving a serial number for the application from the process manager of the system;

retrieving the table of TSM documents corresponding to the application;

identifying the TSM document record to use for ending communication using the table of TSM documents;

deactivating the input method and the text services for this document;

clearing a flag in the TSM document record to indicate the TSM document is inactive; and clearing the TSM global to remove the TSM document and application as being used for communication.

25. In a system having a process manager, a plurality of input methods, a plurality of text services, and a Text Services Manager (TSM) comprising a TSM Global memory, a table of applications, a plurality of tables of TSM documents, and a plurality of TSM document records; an apparatus for creating a TSM document, said apparatus comprising a:

means for receiving a request from an application to open a TSM document;

means for retrieving a serial number for the application from the process manager of the system;

means for retrieving the table of TSM documents corresponding to the application;

means for allocating memory for a new TSM document record;

means for creating the new TSM document record;

means for adding an identification number for the new TSM document record to the table of TSM documents;

means for determining a current input method being used by the system;

means for setting a default input method for the new TSM document equal to the current input method;

means for opening an instance of the input method corresponding to the default input method and saving it in the new TSM document record; and means for updating menus based on the opened instance of the input method.

26. The apparatus of claim 25, wherein the means for retrieving the table of TSM documents corresponding to the application, further comprises a:

means for accessing the TSM global memory; and means for using a pointer in the TSM global memory to determine a location of the table of applications;

means for retrieving the table of applications; and means for using a pointer in the table of applications to determine a location of the table of TSM documents corresponding to the application.

27. In a system having a process manager, a plurality of input methods, a plurality of text services, and a Text Service Manager (TSM) comprising a TSM Global memory, a table of TSM aware applications, a plurality of tables of TSM documents, and a plurality of TSM document records; an apparatus for using a TSM document to establish communication between an application and an input method, the apparatus comprising a:

means for receiving a request from an application to use a TSM document;

means for retrieving a serial number for the application from the process manager of the system;

means for retrieving the table of TSM documents corresponding to the application;

means for identifying the TSM document record to use from the table of TSM documents;

means for determining a language used by the TSM document from data stored in the identified TSM document record;

means for comparing the language used by the TSM document to a language currently being used by the system;

means for changing the language currently being used by the system to the language used by the TSM document if they are not the same;

means for determining whether a instance of the input method for the language currently being used is open;

means for opening an instance of the input method corresponding to the language currently being used if an instance is not open;

means for activating the input method and the text services for this document;

means for updating a menu and a palette of the system to correspond to a type specified in the activated TSM document;

means for setting a flag in the TSM document record to indicate the TSM document is in use; and means for updating the TSM global memory to identify the active TSM document an application.

28. In a system having a process manager, a plurality of input methods, a plurality of text services, and a Text Service Manager (TSM) comprising a TSM Global, a table of TSM aware applications, a plurality of tables of TSM documents, and a plurality of TSM document records; an apparatus for using a TSM document to end communication between an application and an input method, the apparatus comprising a:

means for receiving a request from an application to end communication with an input method using a TSM document;

means for retrieving a detail number for the application from the process manager of the system;

means for retrieving the table of TSM documents corresponding to the application;

means for identifying the TSM document record to use for ending communication using the table of TSM documents;

means for deactivating the input method and the text services for this document;

means for clearing a flag in the TSM document record to indicate the TSM document is inactive; and means for clearing the TSM global to remove the TSM document and application as being used for communication.

* * * * *